United States Patent
Fukuzawa et al.

(10) Patent No.: US 9,007,720 B2
(45) Date of Patent: Apr. 14, 2015

(54) MAGNETIC RECORDING DEVICE

(75) Inventors: Hideaki Fukuzawa, Kawasaki (JP); Hiromi Yuasa, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1171 days.

(21) Appl. No.: 12/213,417

(22) Filed: Jun. 19, 2008

(65) Prior Publication Data

US 2009/0080109 A1    Mar. 26, 2009

(30) Foreign Application Priority Data

Sep. 26, 2007  (JP) ................. P2007-250166

(51) Int. Cl.
| | | |
|---|---|---|
| G11B 5/127 | (2006.01) | |
| G11B 5/02 | (2006.01) | |
| B82Y 10/00 | (2011.01) | |
| G11B 5/31 | (2006.01) | |
| G11B 5/39 | (2006.01) | |
| G11B 5/66 | (2006.01) | |
| G11B 5/74 | (2006.01) | |
| G11B 5/82 | (2006.01) | |
| G11B 5/00 | (2006.01) | |

(52) U.S. Cl.
CPC . *G11B 5/02* (2013.01); *B82Y 10/00* (2013.01); *G11B 5/314* (2013.01); *G11B 5/3983* (2013.01); *G11B 5/66* (2013.01); *G11B 5/743* (2013.01); *G11B 5/746* (2013.01); *G11B 5/82* (2013.01); *G11B 2005/0002* (2013.01); *G11B 2005/0024* (2013.01)

(58) Field of Classification Search
USPC ............................. 360/125.3, 327.24, 327.33
See application file for complete search history.

(56) References Cited

U.S. PATENT DOCUMENTS

| | | | | | |
|---|---|---|---|---|---|
| 3,655,441 | A | * | 4/1972 | Kefalas | 360/134 |
| 4,523,243 | A | * | 6/1985 | Billington | 360/327.24 |
| 5,159,511 | A | * | 10/1992 | Das | 360/327.33 |
| 5,748,414 | A | * | 5/1998 | Kim et al. | 360/327.33 |
| 5,867,350 | A | * | 2/1999 | Haga et al. | 360/319 |

(Continued)

FOREIGN PATENT DOCUMENTS

| | | | | | |
|---|---|---|---|---|---|
| JP | 06243527 | A | * | 9/1994 | ............. G11B 11/10 |
| JP | 07-244801 | | | 9/1995 | |

(Continued)

OTHER PUBLICATIONS

Zhu et al, "Microwave Assisted Magnetic Recording", IEEE Transactions on Magnetics, v. 44, No. 1, Jan. 2008, p. 125-131.*

(Continued)

*Primary Examiner* — Julie Anne Watko
(74) *Attorney, Agent, or Firm* — Nixon & Vanderhye, P.C.

(57) ABSTRACT

A magnetic recording device includes: a magnetic recording medium containing a plurality of recording layers; a magnetic recording head for conducting magnetic writing of information in the magnetic recording medium; and a magnetic reproducing head for conducting magnetic reading out of the information from the magnetic recording medium; wherein the magnetic recording head includes a high frequency oscillator for magnetically assisting the magnetic writing of the information so as to change a magnetization of at least one of the plurality of recording layers of the magnetic recording medium, thereby recording a plurality of information different from one another in the magnetic recording medium commensurate with a total amount of magnetization of the plurality of recording layers.

19 Claims, 15 Drawing Sheets

(56) References Cited

U.S. PATENT DOCUMENTS

| | | | |
|---|---|---|---|
| 6,947,235 B2* | 9/2005 | Albrecht et al. | 360/55 |
| 7,785,662 B2 | 8/2010 | Fuji et al. | |
| 7,965,474 B2* | 6/2011 | Sato et al. | 360/324.12 |
| 2004/0246632 A1* | 12/2004 | Nishioka et al. | 360/324.11 |
| 2005/0023938 A1* | 2/2005 | Sato et al. | 310/363 |
| 2005/0063104 A1* | 3/2005 | Takagishi et al. | 360/324.2 |
| 2005/0207050 A1* | 9/2005 | Pokhil et al. | 360/39 |
| 2005/0219771 A1* | 10/2005 | Sato et al. | 360/324.2 |
| 2006/0039089 A1* | 2/2006 | Sato | 360/324 |
| 2006/0177703 A1* | 8/2006 | Takenoiri et al. | 428/829 |
| 2006/0198047 A1 | 9/2006 | Xue et al. | |
| 2007/0109147 A1 | 5/2007 | Fukuzawa et al. | |
| 2008/0019040 A1* | 1/2008 | Zhu et al. | 360/110 |
| 2008/0112087 A1* | 5/2008 | Clinton et al. | 360/317 |
| 2008/0218891 A1* | 9/2008 | Gubbins et al. | 360/59 |
| 2009/0262457 A1* | 10/2009 | Rivkin et al. | 360/110 |

FOREIGN PATENT DOCUMENTS

| | | | | |
|---|---|---|---|---|
| JP | 07244801 A | * | 9/1995 | G11B 5/02 |
| JP | 2003-317220 | | 11/2003 | |
| JP | 2006-059474 | | 3/2006 | |
| JP | 2006-244693 | | 9/2006 | |
| JP | 2007-115960 | | 5/2007 | |
| JP | 2007-124340 | | 5/2007 | |

OTHER PUBLICATIONS

Zhu, J-G et al., "Microwave Assisted Magnetic Recording (MAMR)", Carnegie Mellon University, B6, pp. 34-35.

Office Action dated Oct. 25, 2011 in JP Application No. 2007-250166 with English language-translation thereof.

English-language machine translation of JP 07-244801.

English-language machine translation of JP 2003-317220.

English-language machine translation of JP 2006-059474.

Japanese Office Action issued for Japanese Patent Application No. JP2007-250166, dated Aug. 21, 2012 with English Translation.

* cited by examiner

Areas made of same material as areas for bit information to be recorded and simply not magnetically recorded

MAGNETIC RECORDING DEVICE

CROSS-REFERENCE TO RELATED APPLICATIONS

This application is based upon and claims the benefit of priority from the prior Japanese Patent Application No. 2007-250166, filed on Sep. 26, 2007; the entire contents of which are incorporated herein by reference.

BACKGROUND OF THE INVENTION

1. Field of the Invention

The present invention relates to a magnetic recording device realizing multi-data recording.

2. Description of the Related Art

The development in high density recording and large capacity of a magnetic recording drive (Hard disk drive) influences the growth of a portable music media player and a video recorder in addition to a PC and a server. The degree of distribution of the magnetic recording device depends on the capacity of the magnetic recording device. The key point enhancing the capacity of the magnetic recording device almost depends on the enhancement of the recording density.

As an index relating to the recording density, a unit of bit number per square inch, that is, bit/inch$^2$ (bpsi) is employed. As of now, the recording density is being enhanced by reducing the size per bit. With the bit size reduction, if the recording density reaches several Tbpsi, the line size per bit becomes 10 nm or less.

However, it is obvious the reduction in line size per bit by the conventional technique has its limitation as follows.

In order to read out small bits, the element size of a magnetic head to be employed is required to be downsized. Then, the element size of the magnetic head depends on the minimum line width limitation in photolithography technique. If the photolithography technique is developed so as to reduce the bit size, it becomes difficult the bit data stored in the corresponding bits formed in a magnetic recording medium are maintained originated from the heat fluctuation of the magnetic recording medium. Moreover, if a material with a higher magnetic anisotropy can be developed, bits formed at a magnetic recording medium made of the material can not be inverted by a magnetic head so that the intended magnetic recording can not be realized. In addition, if the bit size is set to 10 nm or less, the inherent magnetic feature of the material forming the magnetic recording medium can not be exhibited because the total number of atoms in the material contributing to the bit formation is decreased. In other words, if the material with the higher magnetic anisotropy is developed, the inherent magnetic feature of the material can be exhibited within a bit size range of 20 to 30 nm, but not within a bit size range of 10 nm or less.

According to the conventional technique of reducing the size per bit, the high density recording not only in the magnetic recording device but also in a storage device has its limitation in itself.

As described above, it is obvious the high density recording technique has its physical limitation by means of the reduction in bit size. In order to realize the high density recording not utilizing the reduction in bit size, multi-data recording and multi-layer recording can be exemplified as semiconductor memory technical field. In this case, since multiple data can be stored per area corresponding to 1 bit/1 pattern in the magnetic recording medium, the recording density can be enhanced.

It is difficult, however, to apply the multi-data recording technique and the multi-layer recording technique to the magnetic recording technical field, different from the semiconductor memory technical field.

With the multilayer recording technique, a semiconductor memory is configured such that a plurality semiconductor chips are stacked so as to be electrically connected with one another with electric wires. In this case, the multilayer recording can be realized by flowing a current selectively in one or more of the electric wires. In this case, it is required to form the multiple wires for realizing the electrical connection by means of minute processing technique. Since the minute processing technique is complicated, it is difficult to form the multiple wires, but the intended multi-layer recording can be realized in principle by the multiple wires.

In the magnetic recording device, however, no magnetic wire can be formed between the magnetic head and the magnetic recording medium. In this case, since it is required to dispose the magnetic head away from the magnetic recording medium, a minute space is formed between the magnetic head and the magnetic recording medium. In this point of view, the selective bit formation can not be realized using the magnetic wire so that some bits may be formed in the area of the magnetic recording medium in the vicinity of the magnetic head when intended bits are formed in the area away from the magnetic recording medium. Namely, suppose that the magnetic recording medium contains a plurality of recording layers, when the magnetic recording is carried out for the lower recording layer, the magnetic recording is also carried out for the upper recording layer so that some bits may be formed at the upper recording layer in addition to the lower recording layer. Therefore, the selective magnetic recording for the upper recording layer and the lower recording layer can not be realized. In the magnetic recording device, as a result, it is difficult to realize the multi-layer recording in principle.

With the multi-data recording technique, the bit information stored in the corresponding bit is recognized as a numeral "1" or "0" commensurate with the direction in magnetization of the bit. In order to realize the multi-data recording, in this point of view, it is required to set the direction in magnetization of the bit to zero degree meaning that the bit magnetization is oriented parallel to the surface of the magnetic recording medium, 45 degrees meaning that the bit magnetization is oriented in inclination from the direction perpendicular to the surface of the magnetic recording medium and the like. However, it is very difficult to realize the state where the bit magnetization is oriented parallel to the surface of the magnetic recording medium, the state where the bit magnetization is oriented in inclination from the direction perpendicular to the surface of the magnetic recording medium and the like. As of now, there is no technique to realize the above-described bit magnetization states. As a result, it is very difficult to realize the multi-data recording in the magnetic recording device.

BRIEF SUMMARY OF THE INVENTION

An aspect of the present invention relates to a magnetic recording device, including: a magnetic recording medium containing a plurality of recording layers; a magnetic recording head for conducting magnetic writing of information in the magnetic recording medium; and a magnetic reproducing head for conducting magnetic reading out of the information from the magnetic recording medium; wherein the magnetic recording head includes a high frequency oscillator for magnetically assisting the magnetic writing of the information so as to change a magnetization of at least one of the plurality of recording layers of the magnetic recording medium, thereby recording a plurality of information different from one another in the magnetic recording medium commensurate with a total amount of magnetization of the plurality of recording layers.

Another aspect of the present invention relates to a magnetic recording device, including: a magnetic recording medium containing a plurality of recording layers; a magnetic recording head for conducting magnetic writing of information in the magnetic recording medium; and a magnetic reproducing head for conducting magnetic reading out of the information from the magnetic recording medium; wherein the magnetic reproducing head is configured so as to detect an intensity of a magnetic field caused from a total amount of magnetization of the plurality of recording layers of the magnetic recording medium and then, read out a plurality of information different from one another which are recorded in the magnetic recording medium.

DETAILED DESCRIPTION OF THE INVENTION

Hereinafter, the present invention will be described in detail with reference to the drawings.
(Principles of Multi-Layer Recording and Multi-Data Recording)

First of all, the principles of multi-layer recording and multi-data recording in a magnetic recording device according to an embodiment will be described referring to a conventional magnetic recording device.
(Reproducing)

Figure 1:
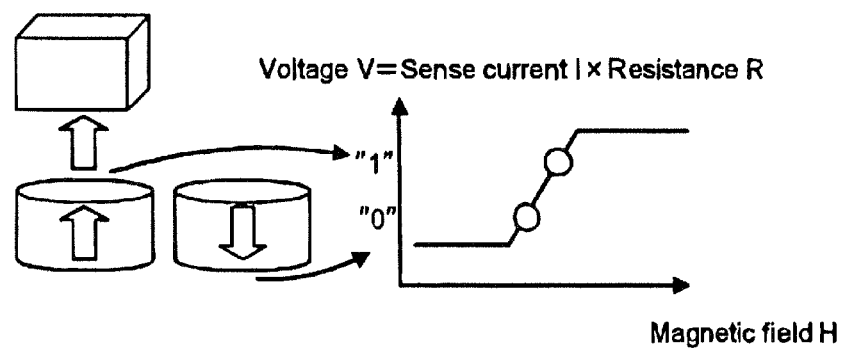
FIG. 1 is an explanatory view showing the magnetic recording states relating to numeral "0" and "1" bit information in a magnetic recording medium of a conventional magnetic recording device.

FIG. 1 is an explanatory view showing the magnetic recording states relating to numeral "0" and "1" bit information in a magnetic recording medium of a conventional magnetic recording device. As shown in FIG. 1, the numeral "0" or "1" bit information is recorded in a magnetic recording medium of the magnetic recording device commensurate with the direction in magnetization of bit. In this case, the numeral "1" is allotted to the magnetization state of bit directed upward in the direction perpendicular to the surface of the magnetic recording medium and the numeral "0" is allotted to the magnetization state of bit directed downward in the direction perpendicular to the surface of the magnetic recording medium. Alternatively, the numeral "0" is allotted to the magnetization state of bit directed upward in the direction perpendicular to the surface of the magnetic recording medium and the numeral "1" is allotted to the magnetization state of bit directed downward in the direction perpendicular to the surface of the magnetic recording medium.

The above-mentioned bit recording can be performed for a Discrete Track medium (DTM) where adjacent tracks are separated with non-magnetic material and a Bit Patterned medium (BPM) where adjacent tracks and adjacent bits are separated with non-magnetic material, respectively, as well as a continuous magnetic medium as a standard medium commercially available.

As a magnetic head to detect the bit information, a magneto-resistance effect element is employed at present. The resistance of the magneto-resistance effect element is changed in accordance with an external magnetic field when a current is flowed in the magneto-resistance effect element. As the magneto-resistance effect element, as of now, a CIP-GMR (current-in-plane giant magnetoresistive) film is widely employed, and recently, a TMR (tunneling magnetoresistive) film is also employed. In the future, a CPP-GMR (current-perpendicular-to-plane) film will be promised as the magneto-resistance effect element. In the exemplified elements, the bit information can be detected by the changes in resistance of the elements when currents are flowed in the elements as described above. The numeral "0" and "1" bit information can be detected by recognizing the higher resistance state and the lower resistance state of the magneto-resistance effect element.

Figure 2:
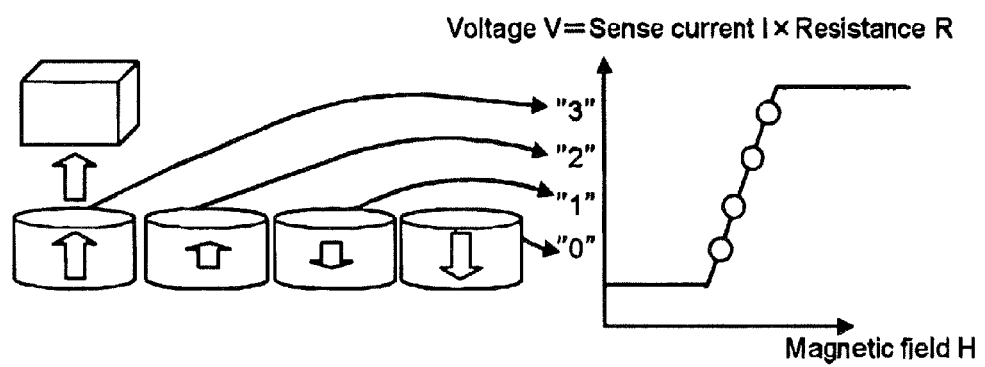
FIG. 2 is an explanatory view showing the magnetic recording states in a magnetic recording medium of a magnetic recording device according to an embodiment.

FIG. 2 is an explanatory view showing the magnetic recording states in a magnetic recording medium of a magnetic recording device according to an embodiment. In order to realize the multi-data recording for the magnetic recording medium, as shown in FIG. 2, a larger upward magnetization state and a smaller upward magnetization state are formed (refer to left side in FIG. 2), and a larger downward magnetization state and a smaller downward magnetization state are formed (refer to right side in FIG. 2). Then, the formation of the larger magnetization state and the smaller magnetization state will be described in detail hereinafter.

The larger magnetization state and the smaller magnetization state in the magnetic recording medium correspond to an external larger magnetic field and an external smaller magnetic field in the magneto-resistance effect element. Herein, the larger magnetization state and the smaller magnetization state are originated from the remanent vertical magnetization of the magnetic recording medium. In this case, since it can be considered that there are a plurality of external magnetic fields with respective different intensities to be applied to the magneto-resistance effect element, the resistance of the magneto-resistance effect element is changed in accordance with the different intensities of the magnetic fields so that in FIG. 2, four bit information of numeral "0", "1", "2" and "3" can be recognized.

The recognition of four bit information using the change in resistance of the magneto-resistance effect element can not be realized when the change in resistance of the magneto-resistance effect element, that is, the MR ratio, is relatively small, but can be realized when the MR ratio is relatively large. For example, when the magneto-resistance effect element is made using the principle of the CIP-GMR film, the TMR film or the CPP-GMR film, the recognition of four bit information can be realized. Any film can be employed as the magneto-resistance effect element only if the MR ratio of the film caused by the external magnetic field is large. Furthermore, a new magneto-resistance effect element exhibiting MR effect based on a quite different principle from the principles of the CIP-GMR film, the TMR film and the CPP-GMR film may be employed. Anyway, any film using any principle may be employed as the magneto-resistance effect element.

The larger magnetization state and the smaller magnetization state originated from the remanent vertical magnetization can not be realized in a conventional magnetic recording medium. In this point of view, it is required the conventional magnetic recording medium is devised to develop a new magnetic recording medium. The fundamental principle of the new magnetic recording medium will be described in reference to FIG. 3.

Figure 3A:
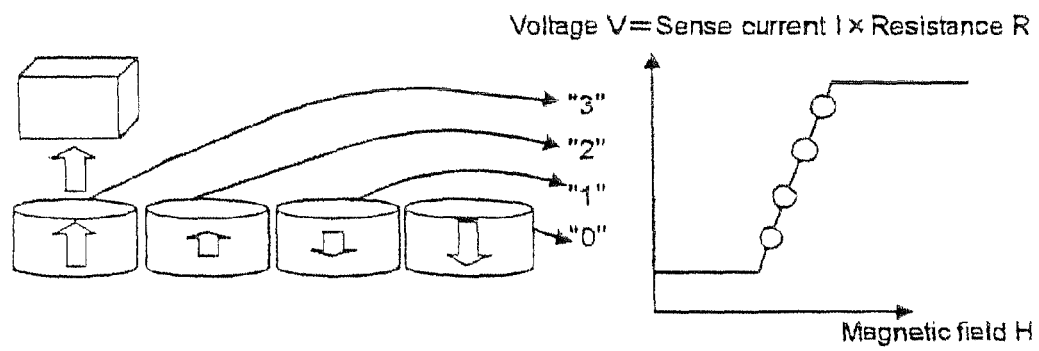
FIGS. 3A-3C are explanatory views showing the magnetic recording states in corresponding recording layers in the magnetic recording medium of the magnetic recording device according to the embodiment.
Figure 3B:
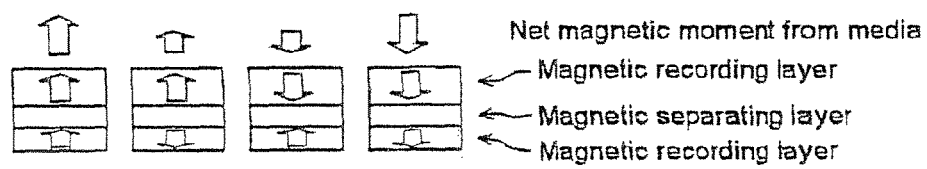

FIG. 3A shows the magnetization state per bit relating to the remanent magnetization per bit. FIG. 3B shows the concrete structure for realizing the magnetization state per bit shown in FIG. 3A. It is necessarily required that a plurality of magnetic recording layers are provided and the adjacent magnetic recording layers are separated with respective magnetic separating layers for realizing the magnetization state shown in FIG. 3B. Each magnetic recording film is made of a hard magnetic film. Since the adjacent magnetic recording layers are separated with the corresponding magnetic separating layers, the magnetic recording layers are magnetically separated from one another so that recording operation can be conducted independently per magnetic recording layer. Bits relating to information to be recorded are formed in one or more of the magnetic recording layers. The magnetic separating layer may be made of a material containing non-magnetic element. As the non-magnetic element, Ru, Pd, Ir and Pt may be exemplified.

In the case that two magnetic recording layers are provided as shown in FIG. 3B, an upward magnetization and a downward magnetization can be formed in the upper magnetic recording layer and the lower magnetic recording layer, respectively. In view of the combination of the upper magnetic recording layer and the lower magnetic recording layer, four magnetization states can be formed. In this case, if the magnetic thickness of the upper magnetic recording layer is set equal to the magnetic thickness of the lower magnetic recording layer, the upward magnetization in the upper magnetic recording layer is cancelled by the downward magnetization in the lower magnetic recording layer while the downward magnetization in the upper magnetic recording layer is cancelled by the upward magnetization in the lower magnetic recording layer. As viewed from the outside of the magnetic recording layers, therefore, no magnetic field is leaked therefrom. As a result, the upward magnetization and the downward magnetization in the upper magnetic recording layer and the lower magnetic recording layer can not be apparently recognized. Herein, the "magnetic thickness" can be represented by "Mrδ" (Mr: remanent magnetization, δ: thickness of magnetic recording layer).

In order to recognize the combination of the upward magnetization and the downward magnetization in the upper magnetic recording layer and the lower magnetic recording layer, in this point of view, it is required that the magnetic thickness Mrδ of the upper magnetic recording layer is set different from the magnetic thickness Mrδ of the lower magnetic recording layer. The magnetic thickness of the upper magnetic recording layer may be set larger than the magnetic thickness of the lower magnetic recording layer, or vice versa. In FIG. 3B, the thickness of the upper magnetic recording layer is set larger than the thickness of the lower magnetic recording layer so that the magnetic thickness Mrδ of the upper magnetic recording layer can be set larger than the magnetic thickness Mrδ of the lower magnetic recording layer. In this case, four bit information recording relating to four remanent magnetic states in the combination of the upper magnetic recording layer and the lower magnetic recording layer can be realized.

Figure 3C:
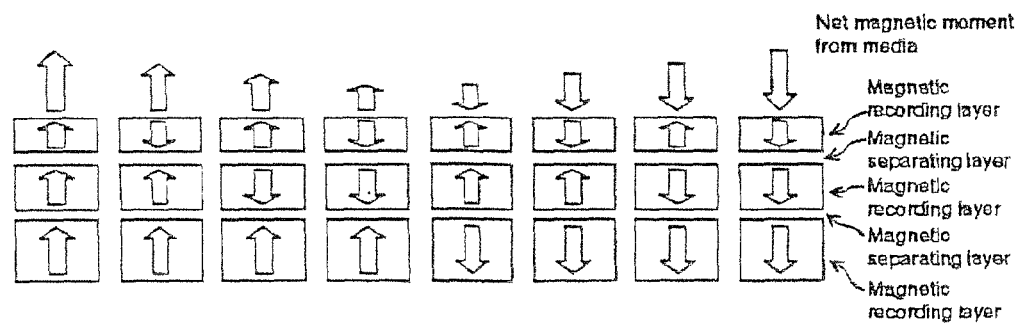

According to the above-described fundamental principle about the multi-data recording, if the number of magnetic recording layers is set to three or more, eight bit information recording can be realized. FIG. 3C shows the state where three magnetic recording layers are provided. The adjacent magnetic recording layers are magnetically separated with respective magnetic separating layers. Then, the magnetic thicknesses of the magnetic recording layers are set different from one another so as to realize the eight bit information recording as shown in FIG. 3C. The reproducing operation of the eight bit information recording can be conducted using a magneto-resistance effect element in the same manner as the embodiments relating to FIG. 2. In this case, since eight resistances can be obtained from the eight bit information, the magnetic head (magneto-resistance effect element) can detect each of the eight bit information by recognizing the eight resistances.

Figure 4:
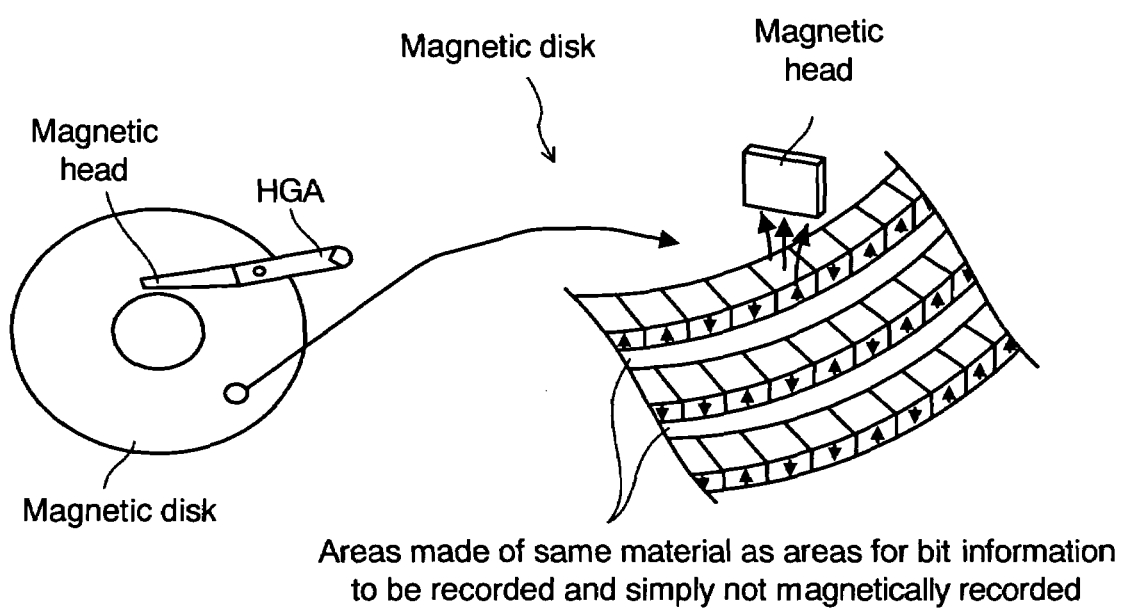
FIG. 4 is a structural view schematically showing a magnetic recording medium of a magnetic recording device according to an embodiment.
Figure 5:
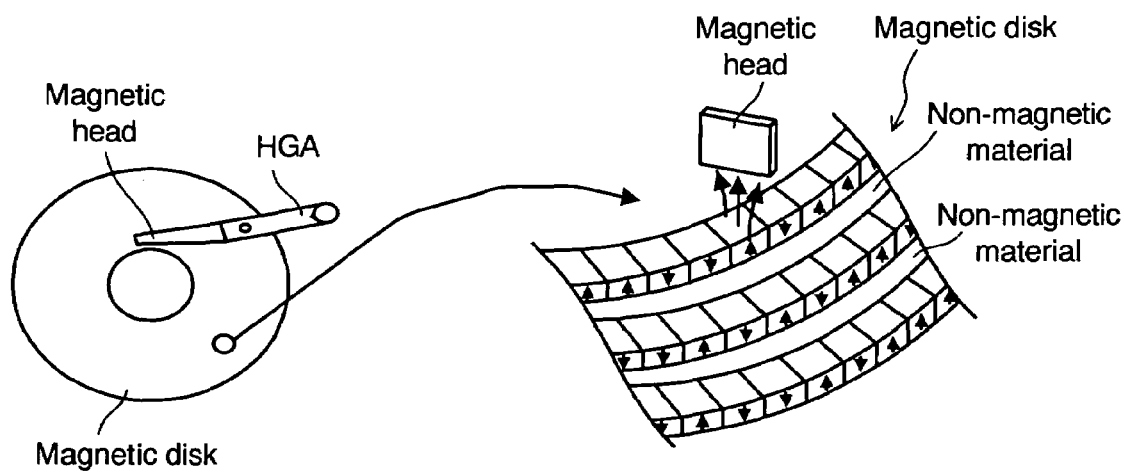
FIG. 5 is a structural view schematically showing a magnetic recording medium of a magnetic recording device according to another embodiment.
Figure 6:
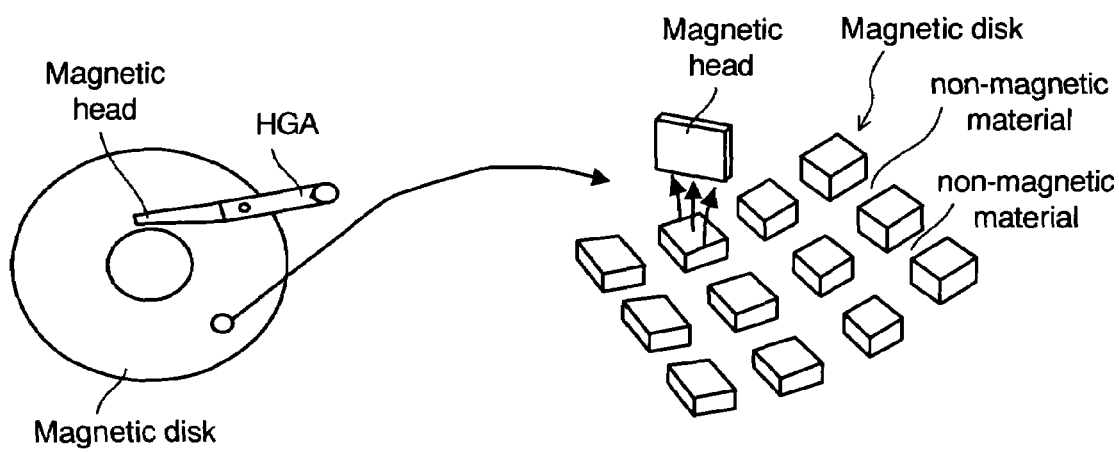
FIG. 6 is a structural view schematically showing a magnetic recording medium of a magnetic recording device according to still another embodiment.

In this embodiment, the magnetic recording medium containing the magnetic recording layers can be configured as a continuous medium where the films constituting the magnetic recording layers are uniformly formed two-dimensionally over the surface of the disk, a Discrete Track medium where the adjacent tracks are magnetically separated with respective non-magnetic materials, or a Bit patterned medium where the adjacent tracks and the adjacent bits are magnetically separated with respective non-magnetic materials. FIG. 4 shows the structure of the continuous medium according to an embodiment. FIG. 5 shows the structure of the Discrete medium according to an embodiment. FIG. 6 shows the structure of the Bit Patterned medium according to an embodiment.

With the continuous medium, the magnetic recording layers are formed over the surface of the disk so that the area to be recorded (bit formation area) is made of the same magnetic material of the area to be not recorded (bit unformation area). The bit formation area is defined by conducting the writing operation with the recording head and the bit unformation area is defined by not conducting the writing operation with the recording head. In FIG. 4, the bit unformation area is not clearly depicted, but formed between the adjacent tracks and the adjacent bits. As described above, the bit unformation area is made of the same material as the bit formation area. With the Discrete Track medium, the adjacent tracks are magnetically separated with respective non-magnetic materials (not shown). With the Bit Patterned medium, the adjacent tracks and the adjacent bits are magnetically separated with respective non-magnetic materials. In view of the reproducing principle, any type of magnetic medium will do. In view of the recording principle, one or more of the magnetic recording media may exhibit some advantages in comparison with the other(s) of the magnetic recording media, which will be described later.

Figure 7:
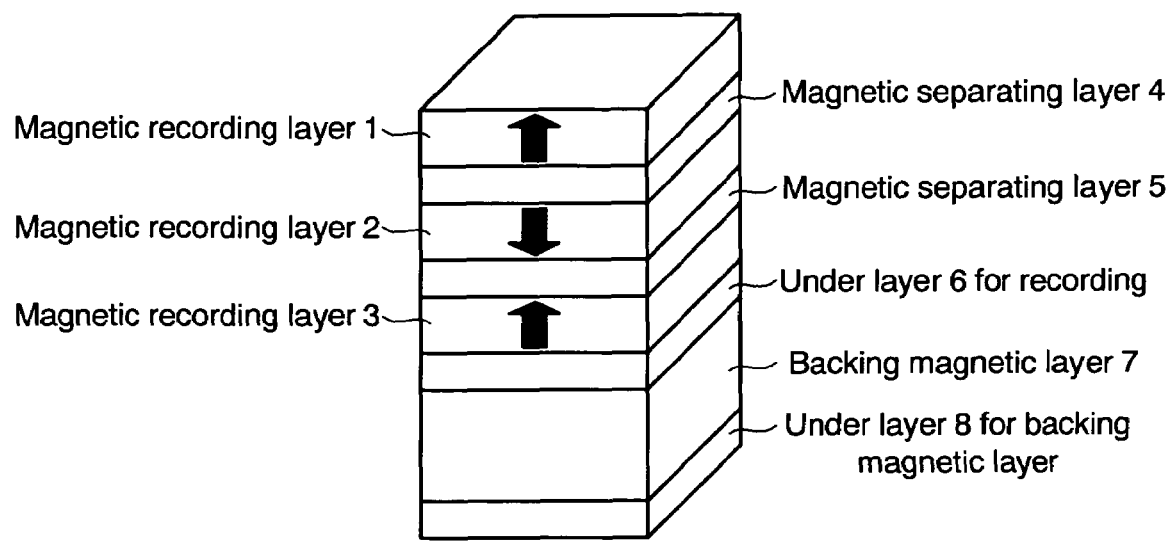
FIG. 7 is a structural view schematically showing a magnetic recording medium of a magnetic recording device according to a further embodiment.

In FIGS. 4 to 6, although only the magnetic separating layers for magnetically separating the magnetic recording layers are depicted except the magnetic recording layers, naturally, a protective layer and/or a lubricant layer may be formed on the top magnetic recording layer and a backing magnetic layer for realizing the vertical magnetic recording may be formed on the bottom magnetic recording layer via a non-magnetic underlayer. FIG. 7 shows the stacking structure below the top magnetic recording layer of a magnetic recording medium according to an embodiment.

In FIG. 7, the magnetic recording layers 1 to 3 are stacked via the magnetic separating layers 4 and 5. Then, the underlayer 6 for controlling the crystallinities of the magnetic recording layers 1 to 3 is formed on the bottom surface of the magnetic recording layer 3. The underlayer 6 can be called as an underlayer for the magnetic recording layers. It is desired that the underlayer 6 is made of non-magnetic material so as to magnetically separate the magnetic recording layer 3 and the backing magnetic layer 7 to be formed on the bottom surface of the underlayer 6. Then, the backing magnetic layer 7 is formed on the bottom surface of the underlayer 6. With the vertical magnetic recording, when the magnetic recording head is considered as a magnetic pole, the backing magnetic layer 7 can be considered as another magnetic pole. In this point of view, the backing magnetic layer 7 is made of soft magnetic material. Then, the backing layer 7 is formed on the underlayer 8 for controlling the crystallinity of the backing magnetic layer 7. The underlayer 8 can be called as an underlayer for the backing magnetic layer 7. Then, the medium substrate made of glass substrate or aluminum substrate (not shown) is provided on the bottom surface of the underlayer 8.
<Recording>

Then, the recording method using a recording head for realizing the multi-data recording will be described. The multi-data recording can not be realized by a conventional recording head. When the magnetic field for recording is applied to the magnetic medium from the conventional recording head, all of the magnetic recording layers are magnetized in the same direction because the magnetic field is oriented in the same direction. In the embodiment relating to FIG. 3B, concretely, when it is intended recording operation is conducted for the lower magnetic recording layer by applying a magnetic field to the lower magnetic recording layer, the upper magnetic recording layer is also magnetized in addition to the lower magnetic recording layer because the magnetic field is also applied to the upper magnetic recording layer in addition to the lower magnetic layer. Therefore, the two-layered structure becomes meaningless in view of the multi-data recording, and thus, the intended multi-data recording can not be realized.

Figure 8:
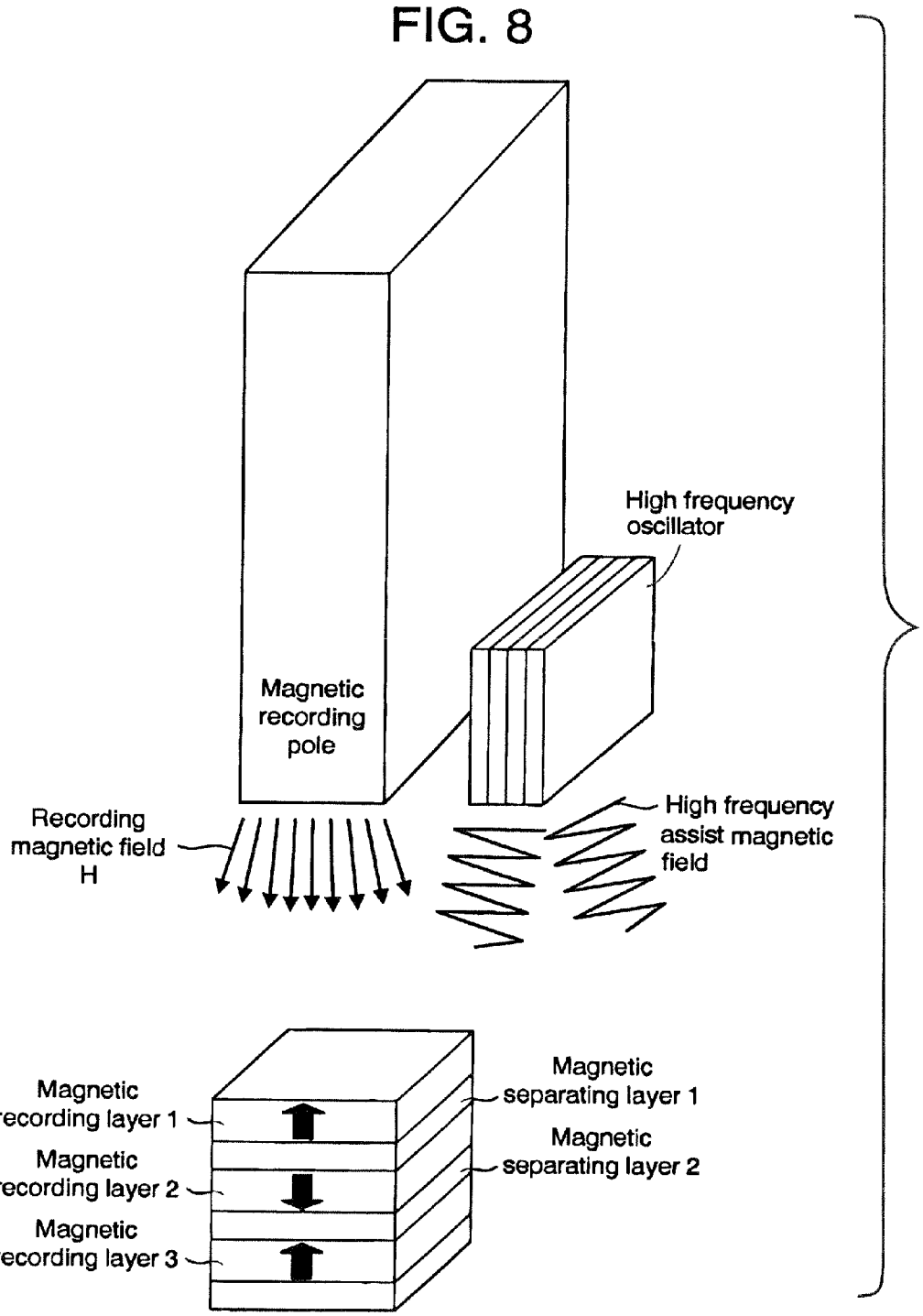
FIG. 8 is a schematic view for explaining a recording method using a magnetic head in a magnetic recording device according to an embodiment.

In this point of view, the structure of a recording head for realizing the multi-data recording will be illustrated in FIG. 8. The magnetic recording head in FIG. 8 conducts a high frequency assist recording using a high frequency oscillator configured such that the oscillating frequency is variable in addition to a recording magnetic pole. According to the magnetic recording head shown in FIG. 8, the selective recording can be conducted for the magnetic recording layers irrespective of the positions of the magnetic recording layers. The principle of the high frequency assist recording will be described.

First of all, the principle of a conventional high frequency assist recording will be described. Referring to Reference 1, a direct current is flowed perpendicular to the film surface of the stacking structure at least made of a magnetic layer/a non-magnetic layer/a magnetic layer to cause a high frequency oscillation based on the spin torque effect, and then, the intensity of a magnetic field for recording is reduced using the high frequency oscillation as an energy assist source. If the frequency of the high frequency oscillation is set almost equal to the magnetic resonance frequency of the magnetic recording medium, the assist effect of the high frequency oscillation is enhanced to reduce the intensity of the magnetic field for recording (inverting the magnetization of a magnetic recording layer).

[Reference 1] Jian-Gang Zhu et al, CMU, B6, "Microwave Assisted Magnetic Recording for 1 Terabit/in$^2$ Density and Beyond", The 18$^{th}$ International Conference on Magnetic Recording Heads and Systems, May 21-23, 2007, Minneapolis, Minn., USA.

The inventors found out that the multi-data recording can be realized when the high frequency assist recording is devised to some degrees. First of all, the magnetic resonance frequencies of the magnetic recording layers are set different from one another as a precondition for realizing the multi-data recording. In this case, when a high frequency oscillation is conducted from the high frequency oscillator, the high frequency oscillation affects one of the magnetic recording layers as an energy assist and dose not affect the others of the magnetic recording layers as an energy assist.

As shown in FIG. 8, in this embodiment, the high frequency oscillator is disposed in the vicinity of the magnetic recording pole. A high frequency assist magnetic field with a predetermined high frequency is generated from the high frequency oscillator at the same time when a recording magnetic field is generated from the magnetic recording pole. Concretely, when a high frequency assist magnetic field almost equal to the ferromagnetic resonance frequency of one of the magnetic recording layers is oscillated from the high frequency oscillator, the intended magnetic recording layer can be assisted in energy so as to be magnetically recorded even though the recording magnetic field is set smaller than a recording magnetic field required for magnetic recording.

Herein, if all of the magnetic recording layers are made of the same material, all of the magnetic recording layers are assisted in energy by the same high frequency assist magnetic field so that only the intended magnetic recording layer can not be recorded. In the embodiment shown in FIG. 8, when the high frequency assist magnetic field with the high frequency f2 almost equal to the ferromagnetic resonance frequency f2' of the magnetic recording layer 2 is applied to the magnetic recording layer 2, only the magnetic recording layer 2 is assisted in energy so as to be recorded (the magnetization is inverted) by the recording magnetic field H. Since the intensity of recording magnetic field H is set smaller than the intensities of recording magnetic fields requiring for recording the magnetic recording layers 1 and 3, the magnetic recording layers 1 and 3 can not be recorded by the recording magnetic field H under no ferromagnetic resonance frequency.

The recording operation for the magnetic recording layers 1 and 3 can be conducted in the same manner as the magnetic recording layer 2. In the case that the recording operation is conducted for the magnetic recording layer 1, the high frequency assist magnetic field with the high frequency f1 almost equal to the ferromagnetic resonance frequency f1' of the magnetic recording layer 1 is generated from the high frequency oscillator and then, the recording magnetic field H is also generated from the magnetic recording pole. In the case that the recording operation is conducted for the magnetic recording layer 3, the high frequency magnetic field with the high frequency f3 almost equal to the ferromagnetic resonance frequency f3' of the magnetic recording layer 3 is generated from the high frequency oscillator and then, the recording magnetic field H is also generated from the magnetic recording pole.

It is amenable design concept that the frequencies f1 to f3 of the high frequency magnetic fields are set almost equal to the ferromagnetic resonance frequencies f1' to f3' of the magnetic recording layers 1 to 3 because the high frequency assist magnetic field can be utilized effectively and efficiently for the magnetic recording for the intended magnetic recording layer. Herein, if the high frequency assist magnetic fields f1 to f3 are set within the ranges of the ferromagnetic resonance frequencies f1' to f3'±1 GHz or less, the above-described magnetic recording utilizing the ferromagnetic resonances of the magnetic recording layers can be conducted.

Alternatively, the magnetic recording utilizing the high frequency energy assist can be realized if the high frequencies f1 to f3 in the high frequency assist magnetic field are not set almost equal to the ferromagnetic resonance frequencies f1' to f3'. Concretely, when a high frequency assist magnetic field with a high frequency of integral multiplication of (½)×ferromagnetic resonance frequency (e.g., ferromagnetic resonance frequency f1') as represented by n×(½)×ferromagnetic resonance frequency is applied to the intended magnetic recording layer, the intended magnetic recording layer can be recorded under high frequency energy assist. In view of the use of the high frequency assist magnetic field with the high frequencies f2 and f3, the magnetic recording can be conducted in the same manner as described above.

In order to change the ferromagnetic resonance frequency, it is most effective to change the material constituting the magnetic recording layer. As well known, the ferromagnetic resonance frequency of the magnetic material is increased as the magnetic anisotropy of the magnetic material is increased.

In this point of view, it is turned out that the ferromagnetic resonance frequency of the ferromagnetic material is changed commensurate with the magnetic anisotropy of the ferromagnetic material. The magnetic anisotropy of the ferromagnetic material can be controlled by adjusting the sort and amount of additive element in the ferromagnetic material and forming another ferromagnetic material layer on the ferromagnetic material.

It is desired that the ferromagnetic resonance frequencies of the magnetic recording layers are different from one another by at least 1 GHz or more. In this case, the magnetic recording utilizing the high frequency energy assist as described above can be easily realized so that the magnetic recording layers can be selectively recorded with the high frequency assist magnetic field and the recording magnetic field.

In order to satisfy the above-described requirement of the ferromagnetic resonance frequencies of the magnetic recording layers being different from one another by at least 1 GHz or more, it is desired that the magnetic recording layers contain at least one element selected from the group consisting of Co, Fe, Ni and Fe such that the contents in the selected element of the magnetic recording layers are different from one another by five atomic % or more.

As apparent from the recording principle as described above, it is necessarily required for the high frequency oscillator that the oscillating frequency of the high frequency oscillator can be changed appropriately, which is important function for the high frequency oscillator. The variable range of the oscillating frequency is set such that when a high frequency assist magnetic field with a predetermined high frequency is applied to a magnetic recording layer, ferromagnetic resonance is caused in the magnetic recording layer and no ferromagnetic resonance is caused in other magnetic recording layers. Concretely, the variable range of the oscillating frequency is set to the order of 1 GHz or more. An embodiment relating to the high frequency oscillator satisfying the above-described requirement will be described.

<Magnetic Recording Medium>

Any magnetic recording medium can be used only if the magnetic recording medium contains a plurality of magnetic recording layers so as to realize the multi-layer recording and multi-data recording through the different magnetic intensities of the magnetic recording layers relating to the data information. For example, a continuous film medium with a recording layer formed over the surface of a disk may be employed as the magnetic recording medium. Alternatively, a Discrete Track medium of which the adjacent tracks are separated with corresponding non-magnetic materials and a Bit Patterned medium of which the adjacent tracks and the adjacent bits are separated with corresponding non-magnetic materials may be employed as the magnetic recording medium.

With the Discrete Track medium and the Bit Patterned medium, since the areas to be recorded is separated with the non-magnetic materials, the ferromagnetic resonance may be caused and concentrated only in the areas to be recorded when the high frequency assist magnetic field is applied. With the Discrete Track medium and the Bit Patterned medium, the areas to be recorded are made of metallic material and other areas not to be recorded such as the areas between the tracks and the areas between the bits are made of insulating material, the high frequency assist magnetic field can be effectively applied to the areas to be recorded so as to be effectively applied to the recording bit areas. The continuous film medium, the Discrete Track medium and the Bit Patterned medium may be configured as shown in FIGS. 4 to 6.

<Overall Structure of Magnetic Head>

Then, the overall structure of a magnetic head to be employed in the magnetic recording device in this embodiment will be described. FIGS. 9 to 12 show the magnetic head schematically.

Figure 9:
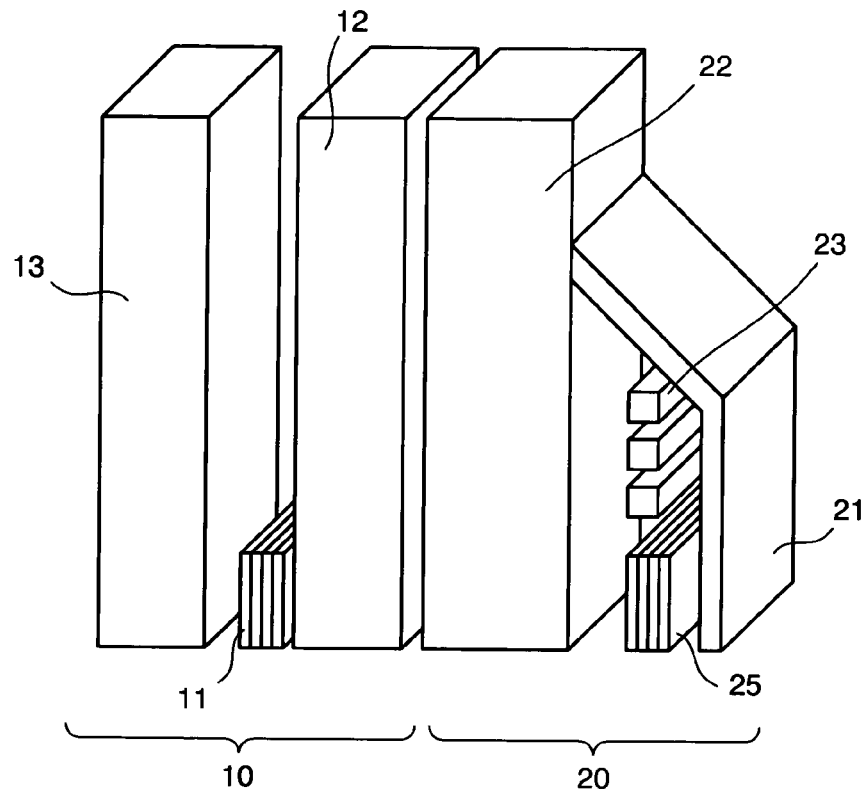
FIG. 9 is a structural view schematically showing the structure of a magnetic head to be employed in a magnetic recording device according to an embodiment.

In FIG. 9, the magnetic head includes a reproducing section 10 containing a magneto-resistance effect element 11, a top shield 12 and a bottom shield 13 sandwiching the magneto-resistance effect element 11, and a recording section 20 containing a recording magnetic pole 21, a yoke 22 with which the rear end of the recording magnetic pole 21 is connected, a coil 23 wound around the recording magnetic field 21 so as to generate a recording magnetic field and a high frequency oscillator 25 disposed between the recording magnetic field 21 and the yoke 22. The reproducing section 10 is disposed in the vicinity of the recording section 20.

Figure 10:
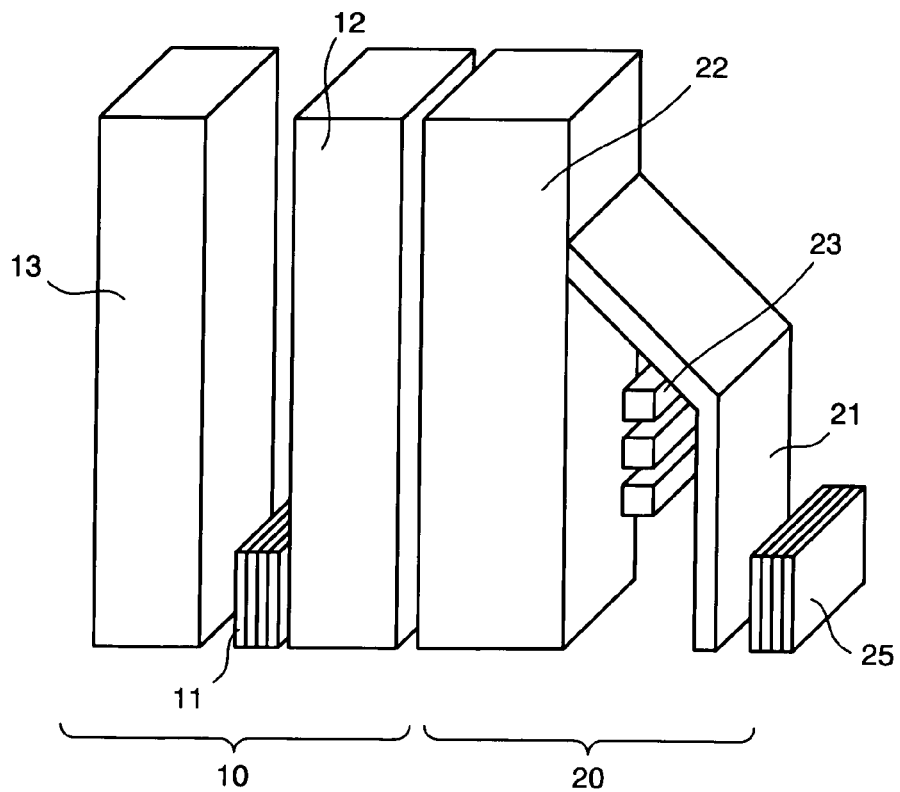
FIG. 10 is a structural view schematically showing the structure of another magnetic head to be employed in a magnetic recording device according to an embodiment.
Figure 11:
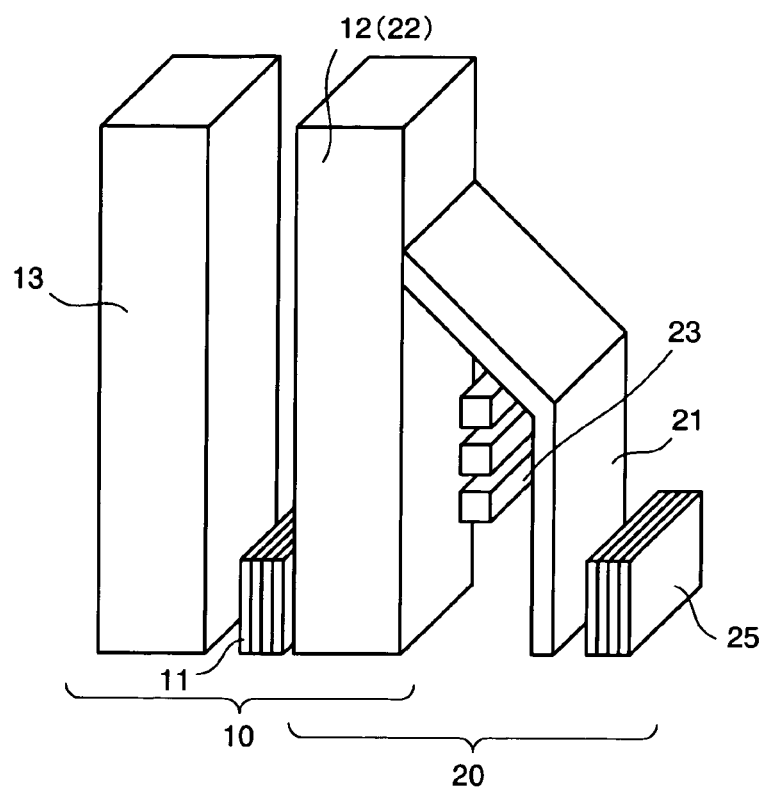
FIG. 11 is a structural view schematically showing the structure of still another magnetic head to be employed in a magnetic recording device according to an embodiment.

The magnetic head shown in FIG. 10 is configured similar to the magnetic head shown in FIG. 9 except that the high frequency oscillator 25 is disposed outside the recording magnetic pole 21 in the recording section 20. The magnetic head shown in FIG. 11 is configured similar to the magnetic head shown in FIG. 10 except that the top shield 12 in the reproducing section 10 also functions as the yoke 22 in the recording section 20. The magnetic head shown in FIG. 12 is configured similar to the magnetic head shown in FIG. 11 except that the magneto-resistance effect element 11 in the reproducing section 10 also functions as the high frequency oscillator 25 in the recording section 20.

Figure 12:
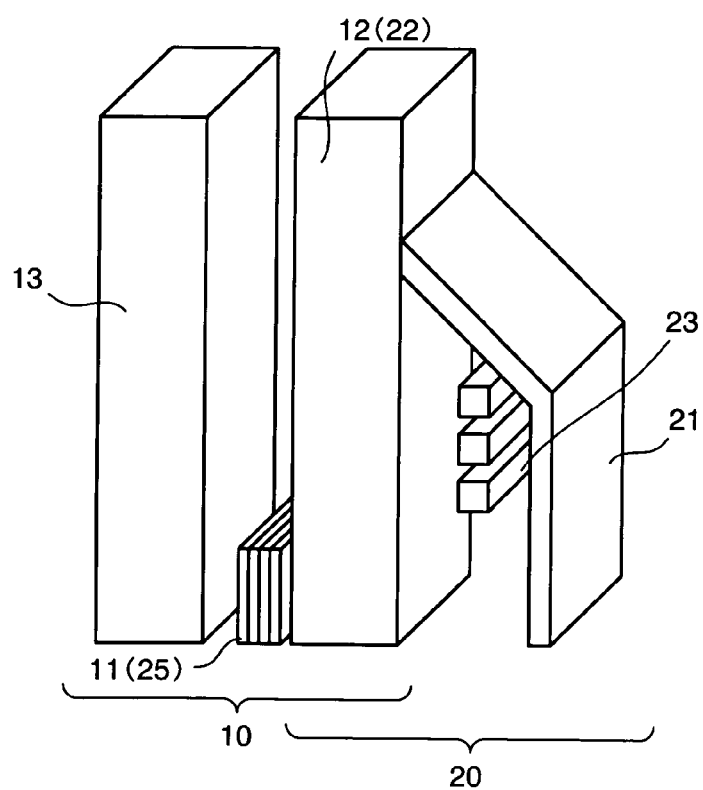
FIG. 12 is a structural view schematically showing the structure of a further magnetic head to be employed in a magnetic recording device according to an embodiment.

As described hereinafter, since the film structure of the magneto-resistance effect element is similar to the film structure of the high frequency oscillator, the magneto-resistance effect element 11 can also function as the high frequency oscillator 25 as shown in FIG. 12. In this case, the period of time requiring for forming the magnetic head can be reduced remarkably so that the yield ratio of the magnetic head can be enhanced. At reproducing, a driving current is flowed in the magneto-resistance effect element 11 so as to exhibit the inherent reproducing function. At recording, another driving current is flowed in the magneto-resistance effect element 11 so as to exhibit the high frequency oscillating function so that the magneto-resistance effect element 11 can function as the high frequency oscillator constituting a high frequency assist source. The driving current at reproducing is different from the driving current at recording. Concretely, the driving current at recording is set higher than the driving current at reproducing.

Any type of magnetic head can be employed only if the multi-layer recording and the multi-data recording can be realized.

<High Frequency Oscillator>

Figure 13:
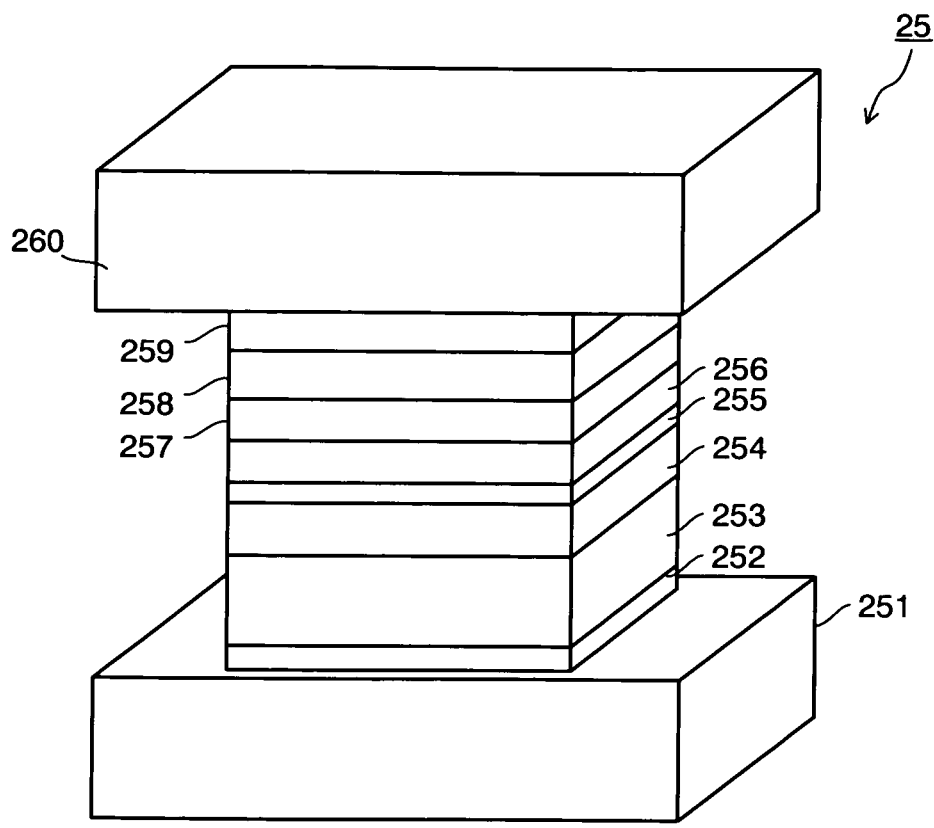
FIG. 13 is a structural view schematically showing the structure of a high-frequency oscillator to be employed in a magnetic recording device according to an embodiment.

Then, a high frequency oscillator to be employed in the magnetic recording device in this embodiment will be concretely described. FIG. 13 is a structural view schematically showing the high frequency oscillator.

In FIG. 13, the high frequency oscillator 25 is configured such that an underlayer 252, a pinning layer 253, a first pinned layer 254, a magnetic coupling layer 255, a second pinned layer 256, a spacer layer 257, a free layer 258 and a cap layer 259 are subsequently stacked from a bottom electrode 251 to a top electrode 260. The pinning layer 253 through the free layer 258 constitute a CCP (Current Perpendicular to Plane) type spin valve structure. The top electrode 260 and the bottom electrode 251 constitute a pair of electrodes for flowing a current in the spin valve structure along the stacking direction (that is, vertically).

The magnetization of the first pinned layer 254 is magnetically fixed with the magnetization of the pinning layer 253 and the second pinned layer 256 is antiferromagnetically coupled with the first pinned layer 254 via the magnetic coupling layer 255 so that the spin valve structure constitutes a synthetic antiferromagnetic (or synthetic antiferrimagnetic) structure.

In the high frequency oscillator 25, the three-layered structure made of the second pinned layer 256, the spacer layer 257 and the free layer 258 causes a high frequency oscillation originated from the spin torque effect as described above. The high frequency oscillation functions as energy assist so as to reduce the intensity of a recording magnetic field for a recording medium.

The bottom electrode 251 and the top electrode 260 are made of low electric resistance material such as NiFe and Cu.

The underlayer 252 can be divided into a buffer layer and a seed layer. The buffer layer functions as reducing the surface roughness of bottom electrode 251. The seed layer functions as controlling the crystal orientation and crystal grain size of the spin valve film to be formed thereon. The buffer layer may be formed of Ta, Ti, W, Zr, Hf, Cr or an alloy thereof in a thickness of 2 to 10 nm, preferably 3 to 5 nm. The seed layer may be formed of Ru or NiFe which can exhibit fcc structure (face-centered cubit structure), hcp structure (hexagonal close-packed structure) or bcc structure (body-centered cubic structure) in a thickness of 1 to 5 nm, preferably 3 to 5 nm.

The pinning layer 253 imparts unidirectional anisotropy to the first pinned layer 254 to be formed thereon so that the magnetization of the first pinned layer 254 is magnetically fixed with the unidirectional anisotropy. For example, the pinning layer 253 is formed of antiferromagnetic material such as PtMn, PdPtMn, IrMn and RuRhMn in a thickness of several nm to several ten nm. The appropriate thickness of the pinning layer 253 depends on the sort of the constituent material thereof.

The first pinned layer 254 and the second pinned layer 256 may be made of ferromagnetic material such as CoFe and NiFe. The magnetic coupling layer 255 may be made of non-ferromagnetic material such as Ru and Cu. The three-layered structure of the first pinned layer 254, the magnetic coupling layer 255 and the second pinned layer 256 may be made of, e.g., $Co_{90}Fe_{10}$ 3.5 nm/Ru/$(Fe_{50}Co_{50}$ 1 nm/Cu 0.25 nm)×2/$Fe_{50}Co_{50}$ 1 nm.

The spacer layer 257 is made of oxide, nitride or oxynitride. For example, the spacer layer 257 may be made of amorphous $Al_2O_3$ or crystal MgO. In view of the inherent function of the spacer layer, the thickness of the spacer layer 257 is set within a range of 1 to 3.5 nm, preferably 1.5 to 3 nm. Moreover, an additive element such as Ti, Hf, Mg, Zr, V, Mo, Si, Cr, Nb, Ta, W, B, C and V may be added to the spacer layer 257. The content of the additive element may be set within a range of 0 to 50%. In an embodiment, the spacer layer 257 may be made of $Al_2O_3$ layer with a thickness of about 2 nm.

The spacer layer 257 may be made of Ti oxide, Hf oxide, Mg oxide, Zr oxide, Cr oxide, Ta oxide, Nb oxide, Mo oxide, Si oxide or V oxide instead of Al oxide such as $Al_2O_3$. In these cases, the additive element may be added to the spacer layer 257 within a content range of 0 to 50%.

The free layer 258 is configured so as to cause the spin torque effect, and thus, made of a two-layered structure of $Co_{90}Fe_{10}$ 1 nm/$Ni_{83}Fe_{17}$ 3.5 nm. The layered structure is formed by disposing the CoFe layer at the interface between the NiFe layer and the spacer layer 257. Moreover, it is desired that the CoFe layer is formed in the vicinity of the spacer layer 257 in comparison that the NiFe layer is formed in the vicinity of the spacer layer 257. The free layer 258 may be made of a multilayered structure formed by alternately stacking CoFe layers or Fe layers each thickness being set within a range of 1 to 2 nm and thinnest Cu layers each thickness being set within a range of 0.1 to 0.8 nm, respectively.

The cap layer 259 functions as protecting the spin valve structure. The cap layer 259 may be made of a plurality of metallic layers, e.g., a two-layered structure of Cu 1 nm/Ru 10 nm. Alternatively, the cap layer 259 may be made of another two-layered structure of Ru 0.5 to 2 nm/Cu by disposing the Ru layer in the vicinity of the free layer 258. The cap layer 259 of the two-layered structure of Ru/Cu is desired when the free layer 258 is made of NiFe because elemental Ru is not solid-solved into (mixed with) elemental Ni so that the magnetostriction originated from the interface mixing layer formed between the free layer 258 and the cap layer 259 can be reduced.

Figure 14:
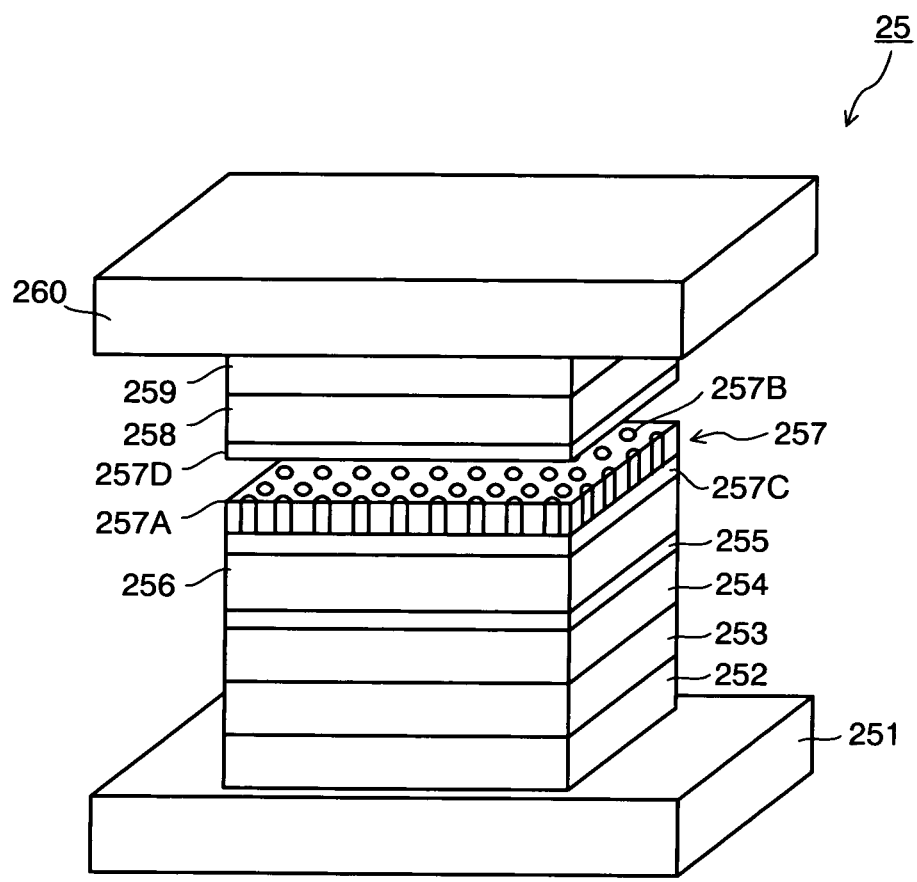
FIG. 14 is a structural view schematically showing the structure of another high-frequency oscillator to be employed in a magnetic recording device according to an embodiment.

FIG. 14 is a structural view schematically showing another high frequency oscillator to be employed in the magnetic recording device in this embodiment. The high frequency oscillator 25 shown in FIG. 14 is configured similar to the high frequency oscillator 25 except that the spacer layer 257 contains an insulating layer 257A, current paths 257B, a bottom metallic layer 257C and a top metallic layer 257D. In this embodiment, therefore, the spacer layer 258 will be described in detail so that the explanations for other components will be omitted.

The insulating layer 257A is made of oxide, nitride or oxynitride. For example, the spacer layer 257 may be made of $Al_2O_3$-based material, as occasion demands, containing an additive element such as Ti, Hf, Mg, Zr, V, Mo, Si, Cr, Nb, Ta, W, B, C and V. The content of the additive element may be set within a range of 0 to 50%. In an embodiment, the insulating layer 257A may be made of $Al_2O_3$ layer with a thickness of about 2 nm. The insulating layer 257A may be made of Ti oxide, Hf oxide, Mg oxide, Zr oxide, Cr oxide, Ta oxide, Nb oxide, Mo oxide, Si oxide or V oxide instead of Al oxide such as $Al_2O_3$. In these cases, the additive element may be added to the spacer layer 257 within a content range of 0 to 50%.

The current paths 257B are paths for flowing a current perpendicular to the film surface of the spacer layer 257. In this case, the current to be flowed is confined in the current paths 257B. Since the current paths 257B function as a conductor for flowing the current perpendicular to the film surface of the insulating layer 257A, the current paths 257B may be made of metallic layers made of Cu or the like. Namely, the spacer layer 257 includes the current confined path structure (CCP structure) so as to cause and enhance the spin torque effect originated from the current confining effect. The current paths 257B may be made of Au, Ag, Al, Ni, Co, Fe or an alloy thereof instead of Cu. The diameter of each current path 257B may be set to an order of several nm, concretely, within a range of 1 to 10 nm.

The top metallic layer 257D composes the spacer layer 257 in the broad sense as described above. Then, the top metallic layer 257D functions as protecting the free layer 258 against the oxide of the spacer layer 257 (i.e., a barrier layer against the oxide of the spacer layer 257) and developing the crystallinity of the free layer 258 because the free layer 258 is formed on the top metallic layer 257D. For example, when the insulating layer 257A is made of amorphous layer (e.g., $Al_2O_3$), the crystallinity of the metallic layer, that is, the free layer 258 to be formed on the insulating layer 257A is deteriorated. In this case, if the top metallic layer 257D is made of a fcc crystallinity-enhancing layer (e.g., Cu layer), the crystallinity of the free layer 258 can be enhanced remarkably. In this case, the thickness of the top metallic layer 257D may be set to 1 nm or less.

The top metallic layer 257D may be omitted. The bottom metallic layer 257C is a source for forming the current paths 257B and thus, made of the same material as the current paths 257B.

In the high frequency oscillator shown in FIG. 14, the current density in the current paths 257B becomes more than $10^8$ A/cm² originated from the current confining effect as described in Reference 2 so that the spin transfer effect is likely to be caused. Namely, the current paths 257B functions as a trigger to cause the spin transfer effect.

[Reference 2] JP-A 2007-124340 (KOKAI)

According to the spin transfer effect, the high frequency oscillation can be conducted easily. In other words, it is desired that the high frequency oscillator contains the current paths 257B, that is, the nano-current path structure in view of the use of the high frequency assist in addition to the multi-layer recording and multi-data recording.

Figure 15:
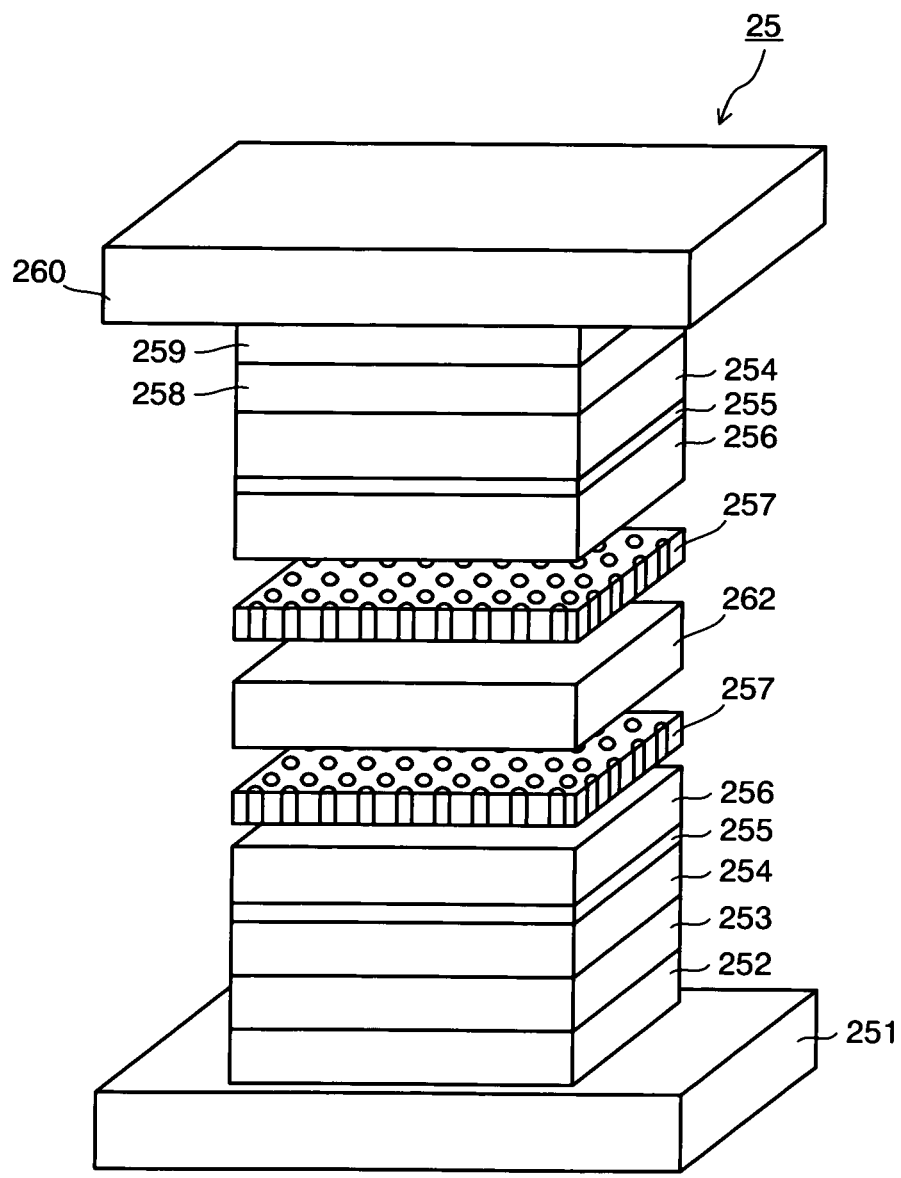
FIG. 15 is a structural view schematically showing the structure of still another high-frequency oscillator to be employed in a magnetic recording device according to an embodiment.

FIG. 15 is a structural view schematically showing the structure of still another high-frequency oscillator to be employed in the magnetic recording device in this embodiment. The high frequency oscillator shown in FIG. 15 is modified from the high frequency oscillator shown in FIG. 14. In FIG. 14, one spacer layer with nano-current path structure is provided, but in FIG. 15, two spacer layers with respective nano-current path structure are provided. Concretely, the third pinned layer 262 is newly provided and the pair of spacer layers 257 (two spacer layers 257) are provided so as to sandwich the third pinned layer 262. In the high frequency oscillator 25 shown in FIG. 15, since two spacer layers 257 are provided, the current confining effect can be enhanced so that the spin transfer effect is likely to be caused. Therefore, the high frequency oscillation can be easily provided.

The concrete structure of the spacer layer 257 in the high frequency oscillator 25 in FIG. 15 can be formed in the same manner as the structure of the spacer layer 257 in the high frequency oscillator 25 in FIG. 14. Moreover, other components except the spacer layers 257 in the high frequency oscillator in FIG. 15 can be formed in the same manner as the components in the high frequency oscillator in FIG. 13.

The number of spacer layer is not limited to one or two as described in the embodiments. For example, the number of spacer layer may be set to three or more.

Figure 16:
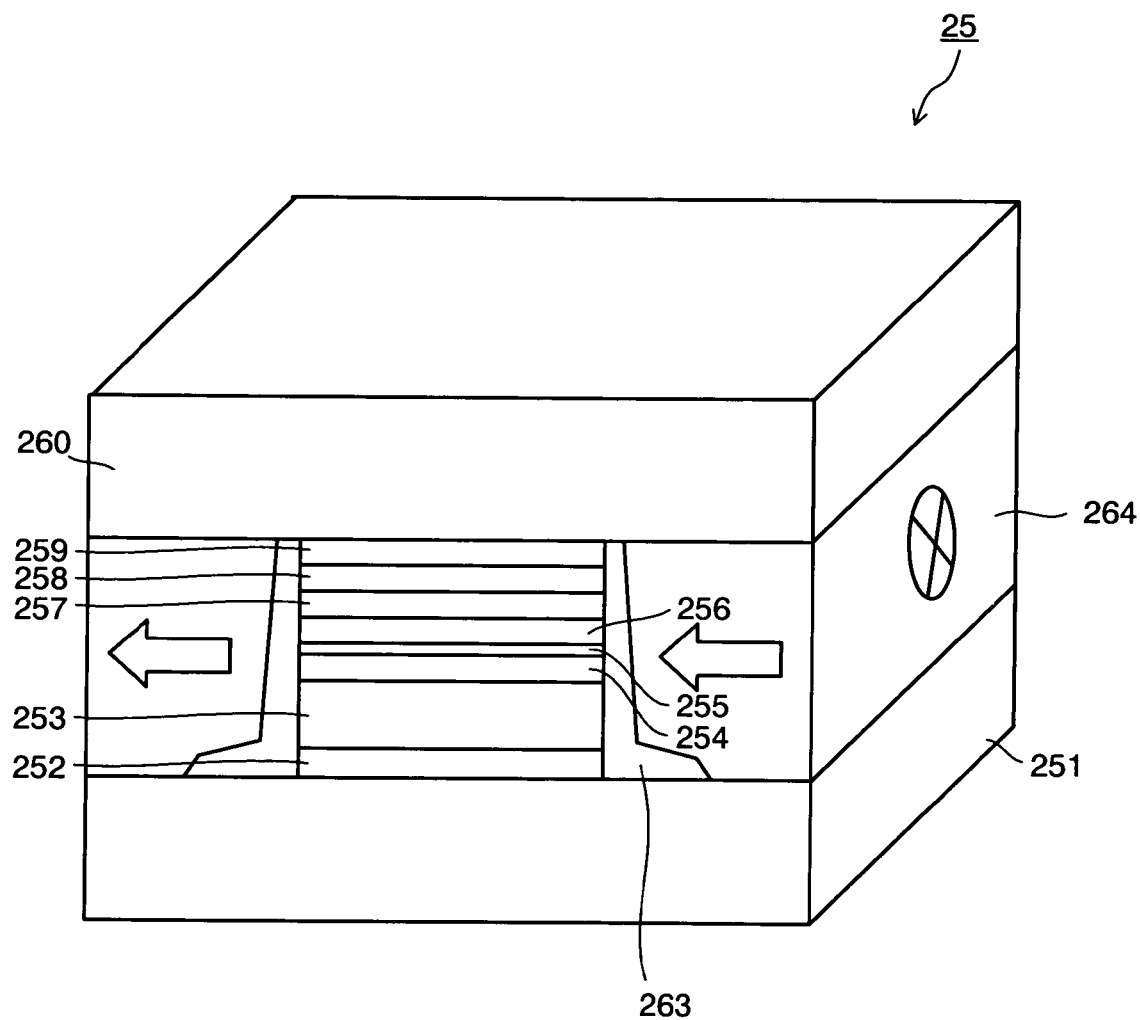
FIG. 16 is a structural view schematically showing the structure of a further high-frequency oscillator to be employed in a magnetic recording device according to an embodiment.

FIG. 16 is a structural view schematically showing the structure of a further high-frequency oscillator to be employed in the magnetic recording device in this embodiment. In the high frequency oscillator 25 in FIG. 16, a pair of hard biasing layers 264 are formed on the sides of the stacking structure of the underlayer 252 through the cap layer 259 between the bottom electrode 251 and the top electrode 260 via respective insulating layers 263, in comparison with the high frequency oscillator 25 in FIG. 13. Other components of the high frequency oscillator 25 in FIG. 16 are configured similar to the components of the high frequency oscillator 25 in FIG. 13.

With a high frequency oscillator, the magnetic anisotropy of the free layer is required to be enhanced so as to realize the high frequency oscillation. Namely, the free layer must be magnetically hard. In this point of view, it is required to apply a biasing magnetic field to the free layer. In FIG. 16, since the hard biasing layers 264 are formed on the sides of the stacking structure of the underlayer 252 through the cap layer 259 via the insulating layers 263, respectively, the free layer 258 is magnetically hard so that the magnetization of the free layer 258 is unlikely to be rotated.

With a magneto-resistance effect element, the hard biasing layers are provided so that the magnetic domain of the free layer is rendered single. In this point of view, the intensity of the biasing magnetic field from the hard biasing layers is set lower. With the high frequency oscillator, in contrast, the intensity of the biasing magnetic field from the hard biasing layers is set higher so that the free layer is magnetically hard. The use and intention of the hard biasing layers are similar to the ones in Reference 2.

The hard biasing layers 263 may be made of CoPt, CoCrPt, CoCr or FePt.

Figure 17:
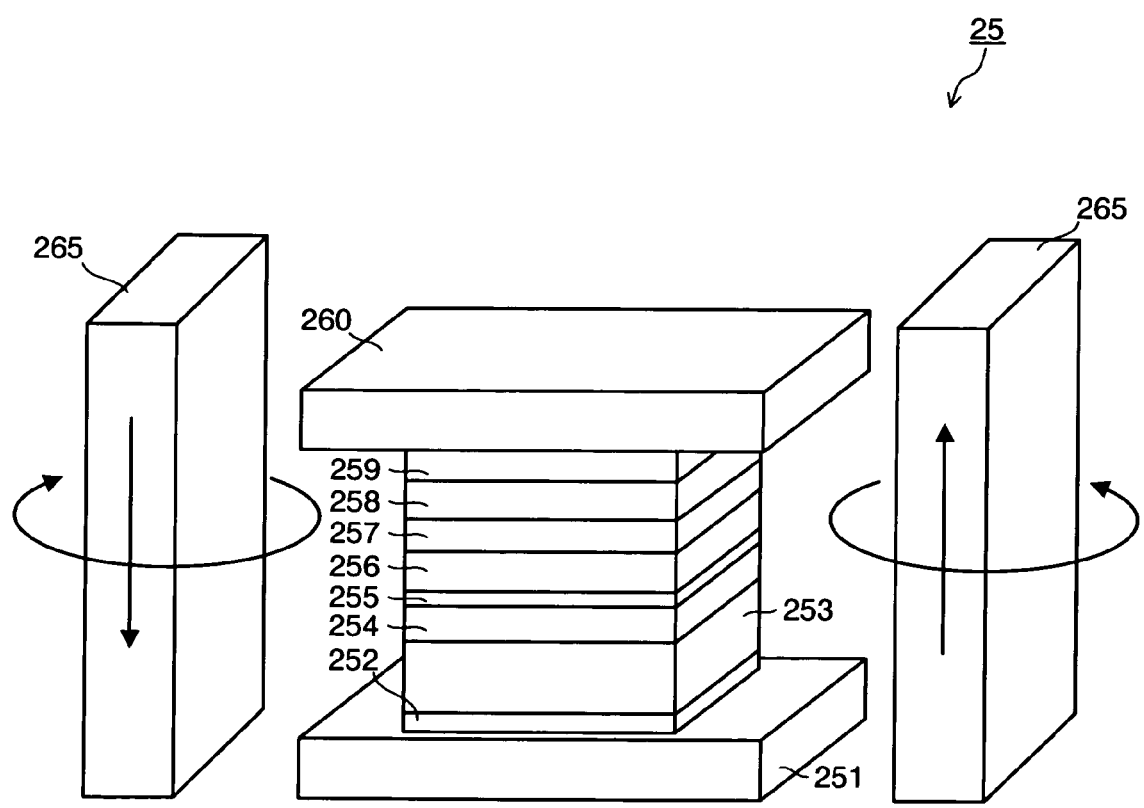
FIG. 17 is a structural view schematically showing the structure of a still further high-frequency oscillator to be employed in a magnetic recording device according to an embodiment.

FIG. 17 is a structural view schematically showing the structure of a still further high-frequency oscillator to be employed in the magnetic recording device in this embodiment. In the high frequency oscillator 25 in FIG. 17, a pair of current wirings 265 are provided in the sides of the stacking structure of the high frequency oscillator 25. Other components in the high frequency oscillator 25 in FIG. 17 are similar to the ones in the high frequency oscillator 25 in FIG. 13.

In the high frequency oscillator 25 in FIG. 17, the intensity of the magnetic field to be applied to the free layer 258 using the current magnetic field from the current wirings 265. The use and intention of the current wirings 265 are similar to the ones in Reference 2. Therefore, the frequency of the high frequency oscillation can be easily increased to an order of several ten GHz by controlling the magnetic field through the appropriate control of the current magnetic field.

Figure 18:
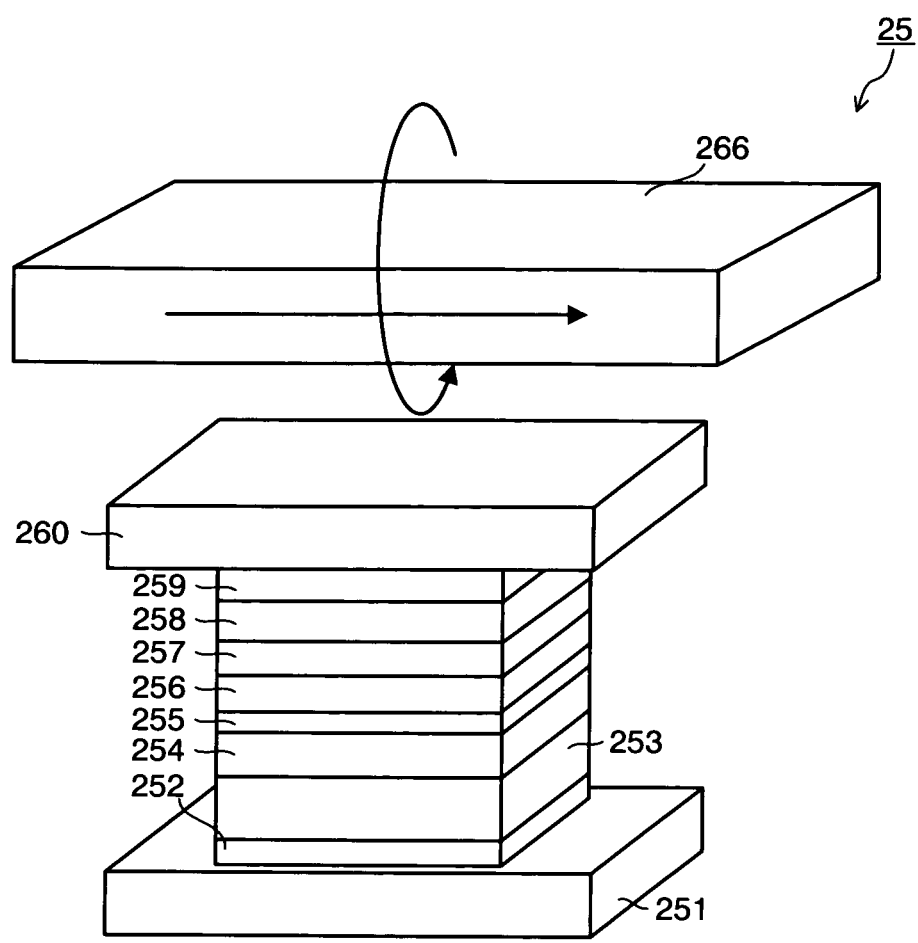
FIG. 18 is a structural view schematically showing the structure of another high-frequency oscillator to be employed in a magnetic recording device according to an embodiment.

FIG. 18 is a structural view schematically showing the structure of another high-frequency oscillator to be employed in the magnetic recording device in this embodiment. The high frequency oscillator shown in FIG. 18 is modified from the high frequency oscillator shown in FIG. 17. In FIG. 18, a current wiring 266 is provided above the stacking structure (top electrode 260) of the high frequency oscillator 25 while in FIG. 17, the pair of current wirings 265 are provided in the sides of the stacking structure of the high frequency oscillator 25. In this case, too, the frequency of the high frequency oscillation can be easily increased to an order of several ten GHz by controlling the magnetic field through the appropriate control of the current magnetic field.

Particularly not shown, the current wiring 266 may be provided below the stacking structure (bottom electrode 251) of the high frequency oscillator 25 and another pair of current wirings may be provided above and below the stacking structure of the high frequency oscillator 25, respectively.

<Magneto-Resistance Effect Element>

Then, the magneto-resistance effect element to be employed in the magnetic recording device in this embodiment will be described. As described above, the magneto-resistance effect element may be configured so as to utilize the principle of the CIP-GMR film, the TMR film or the CPP-GMR film.

The magneto-resistance effect element utilizing the CPP-GMR film may be configured as shown in FIGS. 13 to 15 relating to the high frequency oscillator. The characteristics requiring for the components in the magneto-resistance effect element are set similar to the ones in the high frequency oscillator. Herein, the three-layered structure of the second pinned layer 256, the spacer layer 257 and the free layer 258 functions as a so-called magneto-resistance effect film so as to exhibit the magneto-resistance effect instead of the high frequency oscillation. According to the magneto-resistance effect, the magneto-resistance effect element can detect the magnetic field from a magnetic recording medium, and the intensity of the magnetic field therefrom so as to read out the information recorded in the magnetic recording medium.

In the magneto-resistance effect element, a pair of hard biasing layers may be provided on the sides of the inherent stacking structure of the magneto-resistance effect element. In this case, since the hard biasing layers are mainly provided so that the magnetic domain of the free layer is rendered single, the biasing magnetic field is set lower different from the hard biasing layers to be employed in the high frequency oscillator. As described above, in the high frequency oscillator, the biasing magnetic field is set higher.

Since the magneto-resistance effect element utilizing the CIP-GMR element or the TMR film is commercially available, an appropriate magneto-resistance effect element may be selected from among the ones commercially available. For example, the magneto-resistance effect element utilizing the TMR film can be provided by making the spacer layer 257 of an insulating film in the high frequency oscillator shown in FIG. 13.

<Hard Disk and Head Gimbal Assembly>

Figure 19:
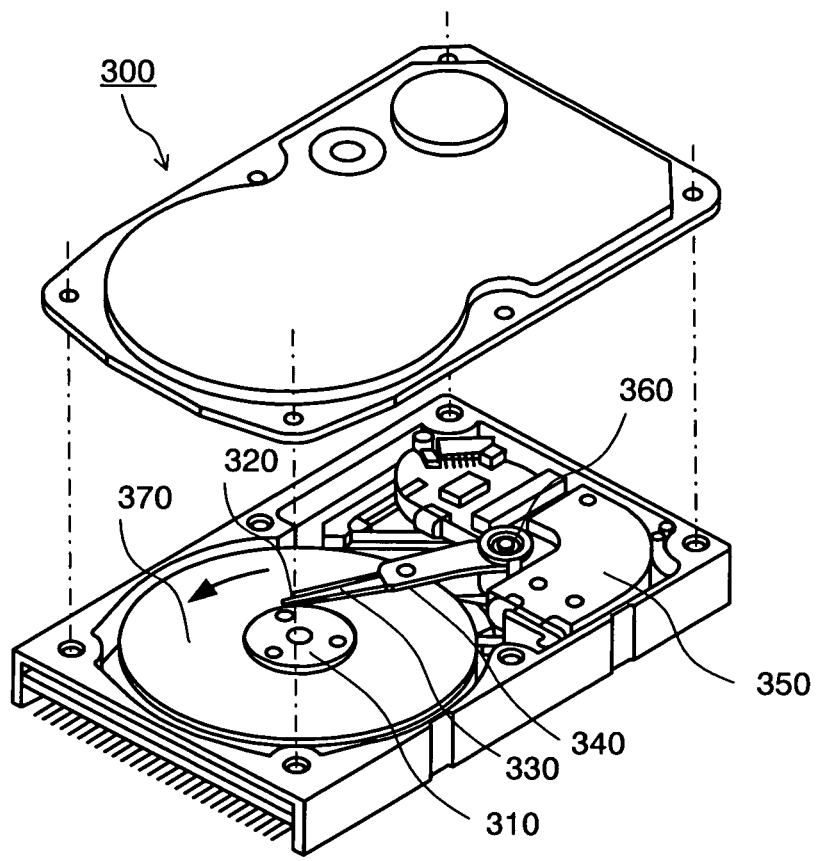
FIG. 19 is a schematic view showing the structure of a magnetic recording/reproducing device including a magnetic head to be employed according to an embodiment.
Figure 20:
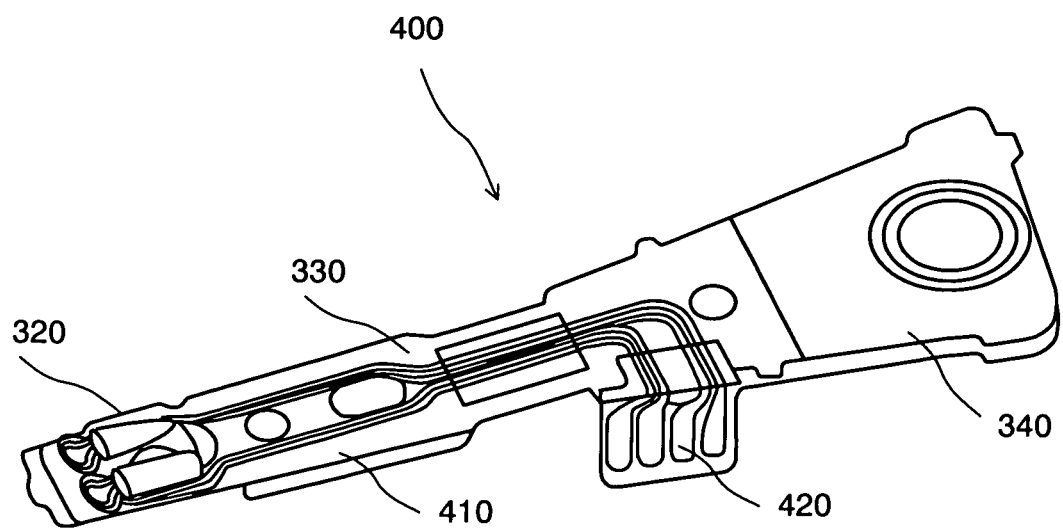
FIG. 20 is a schematic view showing a magnetic head assembly to be built in the magnetic recording/reproducing device shown in FIG. 19.

The magnetic head shown in FIGS. 9 to 12 may be incorporated in an all-in-one recording/reproducing magnetic head assembly (HGA) and then, mounted at a magnetic recording/reproducing device. FIG. 19 is a structural view showing the schematic structure of the magnetic recording/reproducing device. FIG. 20 is a structural view showing the magnetic head assembly incorporated in the magnetic recording/reproducing device shown in FIG. 19.

The magnetic recording/reproducing device 300 shown in FIG. 19 constitutes a rotary actuator type magnetic recording/reproducing device. In FIG. 19, a magnetic recording disk 370 is mounted to a spindle 310 to be turned in the direction designated by the arrow A by a motor (not shown) which is driven in response to control signals from a drive unit controller (not shown). In FIG. 19, the magnetic recording/reproducing apparatus 300 may be provided with a single magnetic recording disk 370, but with a plurality of magnetic recording disks 370.

A head slider 320, which functions as recording/reproducing information to be stored in the magnetic recording disk 370 is mounted on a tip of a suspension 330 of a thin film type. The head slider 320 mounts at the tip the magnetic head containing the magnetic resistance effect element as described in above embodiments.

When the magnetic recording disk 370 is rotated, such a surface (ABS) of the head slider 320 as being opposite to the magnetic recording disk 370 is floated from on the main surface of the magnetic recording disk 370. Alternatively, the slider may constitute a so-called "contact running type" slider such that the slider is in contact with the magnetic recording disk 370.

The suspension 330 is connected to one edge of the actuator arm 340 with a bobbin portion supporting a driving coil (not shown) and the like. A voice coil motor 350 being a kind of a linear motor is provided at the other edge of the actuator arm 340. The voice coil motor 350 is composed of the driving coil (not shown) wound around the bobbin portion of the actuator arm 340 and a magnetic circuit with a permanent magnet and a counter yoke which are disposed opposite to one another so as to sandwich the driving coil.

The actuator arm 340 is supported by ball bearings (not shown) provided at the upper portion and the lower portion of the spindle 360 so as to be rotated and slid freely by the voice coil motor 350.

As shown in FIG. 20, the magnetic head assembly 400 has the actuator arm 340 with the bobbin portion supporting the driving coil and the like. The suspension 330 is connected with the one edge of the actuator arm 340. Then, the head slider 320 with the magnetic head containing the magneto-resistance effect element as defined in above-embodiments is attached to the tip of the suspension 330. The suspension 330 includes a lead wire 410 for writing/reading signals, where the lead wire 410 is electrically connected with the respective electrodes of the magnetic head embedded in the head slider 320. In the drawing, reference numeral "420" denotes an electrode pad of the assembly 400.

In the magnetic recording/reproducing device and the magnetic head assembly shown in FIGS. 19 and 20, since the magnetic head containing the high frequency oscillator as shown above is provided, the intended multi-layer recording and multi-data recording can be realized and the reproducing of the data recorded in the magnetic recording medium through the multi-layer recording and multi-data recording can be also realized.

Although the present invention was described in detail with reference to the above examples, this invention is not limited to the above disclosure and every kind of variation and modification may be made without departing from the scope of the present invention.

What is claimed is:

1. A magnetic recording device, comprising:
    a recording medium comprising:
    a plurality of recording layers, each recording layer having a different thickness, a different ferromagnetic resonance frequency f', and a different coercivity in the absence of high frequency oscillation, wherein the ferromagnetic resonance frequencies of the recording layers differ from one another by at least 1 GHz;
    a magnetic recording head for writing information to the magnetic recording medium, the magnetic recording head including a high frequency oscillator selectively changeable between a first oscillation frequency f1 and a second oscillation frequency f2,
    wherein said first oscillation frequency f1 causes ferromagnetic resonance in a first set of recording layers and does not cause ferromagnetic resonance in each recording layer not included within said first set of recording layers,
    wherein said second oscillation frequency f2 causes ferromagnetic resonance in a second set of recording layers and does not cause ferromagnetic resonance in each recording layer not included within said second set of recording layers, said second set of recording layers differing from said first set of recording layers,
    wherein when said first oscillation frequency is selected, magnetization directions of all recording layers in the first set of recording layers are written by a magnetic field from the magnetic recording head, said magnetic field being less than a magnetic field which would be required to write to any recording layer not included within said first set of recording layers,
    wherein when said second oscillation frequency is selected, magnetization directions of all recording layers in the second set of recording layers are written by a magnetic field from the magnetic recording head, said magnetic field being less than a magnetic field which would be required to write to any recording layer not included within said second set of recording layers; and
    a magnetic reproducing head for reading out information from the magnetic recording medium, wherein said high frequency oscillator functions as a magneto-resistance effect element in said magnetic reproducing head.

2. The device as set forth in claim 1,
    wherein the magnetic reproducing head detects an intensity of a magnetic field caused from a total amount of magnetization of the plurality of recording layers, and reads out information recorded in the magnetic recording medium based on the detected intensity.

3. The device as set forth in claim 1,
    wherein the ferromagnetic resonance frequencies of the recording layers differ from one another by at least 1 GHz.

4. The device as set forth in claim 1,
    wherein each recording layer includes at least one element selected from the group consisting of Co, Fe, Ni and Pt and contents of the at least one element in the respective plurality of recording layers differ from one another by five atomic percent or more.

5. The device as set forth in claim 1,
    wherein the plurality of recording layers are magnetically separated with respective magnetic separating layers including a non-magnetic element.

6. The device as set forth in claim 5,
    wherein each of the magnetic separating layers includes at least one element selected from the group consisting of Ru, Pd, Ir and Pt.

7. The device as set forth in claim 1,
    wherein non-magnetic material is provided between tracks in the magnetic recording medium.

8. The device as set forth in claim 1,
    wherein the oscillating frequency of the high frequency oscillator is set within a frequency range of a ferromagnetic resonance frequency of the at least one recording layer ±1 GHz or less.

9. The device as set forth in claim 1,
    wherein a relation of f1=n×f'/2 (n: integer) is satisfied when an oscillating frequency of the high frequency oscillator is designated by f1 and a magnetic resonance frequency of the first set of recording layers is designated by f', and
    wherein a relation of f2=n×f'/2 (n: integer) is satisfied when an oscillating frequency of the high frequency oscillator is designated by f2 and a magnetic resonance frequency of the second set of recording layers is designated by f'.

10. The device as set forth in claim 1,
    wherein an oscillating frequency of the high frequency oscillator changes on the order of 1 GHz or more.

11. The device as set forth in claim 10,
    wherein the high frequency oscillator is interposed between two hard magnetic layers.

12. The device as set forth in claim 10,
    wherein the high frequency oscillator includes a free layer and a current wiring, the current wiring applying a current magnetic field to the free layer.

13. The device as set forth in claim 1,
    wherein the high frequency oscillator includes a stacked structure comprising at least a fixed magnetization layer, a spacer layer and a free layer, and a pair of electrodes for current flow perpendicular to a film surface of the stacked structure formed at end surfaces of the stacked structure.

14. The device as set forth in claim 13,
    wherein the spacer layer includes an insulating layer and metallic layers formed through the insulating layer so as to function as paths for flowing a current between the fixed magnetization layer and the free layer.

15. The device as set forth in claim 14,
    wherein the insulating layer includes at least one element selected from the group consisting of Al, Ti, Hf, Mg, Zr, Mo, Si, Cr, Nb, Ta, W, B, C and V, and
    wherein each of the metallic layers contains at least one element selected from the group consisting of Cu, Au, Ag, Al, Fe, Co and Ni.

16. The device as set forth in claim 14,
    wherein a diameter of each of the metallic layers is in a range of 1 to 10 nm.

17. The device as set forth in claim 1,
wherein the high frequency oscillator is configured such that a current to flow in use as the magneto-resistance effect element is set lower than a current to flow in use as an inherent oscillator.

18. A magnetic recording device for use with a magnetic recording medium including a plurality of recording layers, each recording layer having a different thickness, a different ferromagnetic resonance frequency f, and a different coercivity in the absence of high frequency oscillation, wherein the ferromagnetic resonance frequencies of the recording layers differ from one another by at least 1 GHz, the magnetic recording device comprising:
a magnetic recording head for writing information to the magnetic recording medium, the magnetic recording head including a high frequency oscillator selectively changeable between a first oscillation frequency f1 and a second oscillation frequency f2,
wherein said first oscillation frequency f1 causes ferromagnetic resonance in a first set of recording layers and does not cause ferromagnetic resonance in each recording layer not included within said first set of recording layers,
wherein said second oscillation frequency f2 causes ferromagnetic resonance in a second set of recording layers and does not cause ferromagnetic resonance in each recording layer not included within said second set of recording layers, said second set of recording layers differing from said first set of recording layers,
wherein when said first oscillation frequency is selected, magnetization directions of all recording layers in the first set of recording layers are written by a magnetic field from the magnetic recording head, said magnetic field being less than a magnetic field which would be required to write to any recording layer not included within said first set of recording layers,
wherein when said second oscillation frequency is selected, magnetization directions of all recording layers in the second set of recording layers are written by a magnetic field from the magnetic recording head, said magnetic field being less than a magnetic field which would be required to write to any recording layer not included within said second set of recording layers; and
a magnetic reproducing head for reading information from the magnetic recording medium, wherein said high frequency oscillator functions as a magneto-resistance effect element in said magnetic reproducing head.

19. A magnetic recording device for use with a magnetic recording medium including a plurality of magnetically separated recording layers, each recording layer having a different thickness, a different ferromagnetic resonance frequency f', and a different coercivity in the absence of high frequency oscillation, wherein the ferromagnetic resonance frequencies of the recording layers differ from one another by at least 1 GHz, the magnetic recording device comprising:
a magnetic recording head for recording information to the magnetic recording medium, the magnetic recording head including a high frequency oscillator selectively changeable between a first oscillation frequency f1 and a second oscillation frequency f2,
wherein said first oscillation frequency f1 causes ferromagnetic resonance in a first set of recording layers and does not cause ferromagnetic resonance in each recording layer not included within said first set of recording layers,
wherein said second oscillation frequency f2 causes ferromagnetic resonance in a second set of recording layers and does not cause ferromagnetic resonance in each recording layer not included within said second set of recording layers, said second set of recording layers differing from said first set of recording layers,
wherein when said first oscillation frequency is selected, magnetization directions of all recording layers in the first set of recording layers are written by a magnetic field from the magnetic recording head, said magnetic field being less than a magnetic field which would be required to write to any recording layer not included within said first set of recording layers,
wherein when said second oscillation frequency is selected, magnetization directions of all recording layers in the second set of recording layers are written by a magnetic field from the magnetic recording head, said magnetic field being less than a magnetic field which would be required to write to any recording layer not included within said second set of recording layers; and
a magnetic read head for reading out information from the magnetic recording medium, wherein said high frequency oscillator functions as a magneto-resistance effect element in said magnetic read head.

* * * * *